(12) United States Patent
Xu et al.

(10) Patent No.: US 11,776,180 B2
(45) Date of Patent: Oct. 3, 2023

(54) CONTROLLED STYLE-CONTENT IMAGE GENERATION BASED ON DISENTANGLING CONTENT AND STYLE

(71) Applicant: ADOBE INC., San Jose, CA (US)

(72) Inventors: Ning Xu, Milpitas, CA (US); Bayram Safa Cicek, Los Angeles, CA (US); Hailin Jin, San Jose, CA (US); Zhaowen Wang, San Jose, CA (US)

(73) Assignee: Adobe Inc., San Jose, CA (US)

( * ) Notice: Subject to any disclaimer, the term of this patent is extended or adjusted under 35 U.S.C. 154(b) by 643 days.

(21) Appl. No.: 16/802,440

(22) Filed: Feb. 26, 2020

(65) Prior Publication Data

US 2021/0264236 A1 Aug. 26, 2021

(51) Int. Cl.
| | |
|---|---|
| *G06N 20/20* | (2019.01) |
| *G06T 11/60* | (2006.01) |
| *G06N 3/088* | (2023.01) |
| *G06T 11/00* | (2006.01) |
| *G06F 18/214* | (2023.01) |
| *G06N 3/045* | (2023.01) |
| *G06V 10/764* | (2022.01) |
| *G06V 10/774* | (2022.01) |

(Continued)

(52) U.S. Cl.
CPC ........... *G06T 11/60* (2013.01); *G06F 18/214* (2023.01); *G06N 3/045* (2023.01); *G06N 3/088* (2013.01); *G06T 11/00* (2013.01); *G06V 10/454* (2022.01); *G06V 10/764* (2022.01); *G06V 10/774* (2022.01); *G06V 10/82* (2022.01); *G06T 2210/36* (2013.01)

(58) Field of Classification Search
CPC ...... G06N 3/088; G06N 3/0444; G06N 3/084; G06N 20/20; G06T 9/002
USPC .................................................... 706/25
See application file for complete search history.

(56) References Cited

U.S. PATENT DOCUMENTS

| | | | |
|---|---|---|---|
| 2016/0379132 A1* | 12/2016 | Jin ..................... | H04L 67/535 706/12 |
| 2019/0295302 A1* | 9/2019 | Fu ........................ | G06N 3/088 |
| 2020/0151559 A1* | 5/2020 | Karras ................ | G06N 3/088 |

OTHER PUBLICATIONS

Li, Y., Fang, C., Yang, J., Wang, Z., Lu, X., & Yang, M. H. (2017). Universal style transfer via feature transforms. In Advances in neural information processing systems (pp. 386-396).

(Continued)

*Primary Examiner* — Gordon G Liu
(74) *Attorney, Agent, or Firm* — Shook, Hardy & Bacon L.L.P.

(57) ABSTRACT

Embodiments of the present disclosure are directed towards improved models trained using unsupervised domain adaptation. In particular, a style-content adaptation system provides improved translation during unsupervised domain adaptation by controlling the alignment of conditional distributions of a model during training such that content (e.g., a class) from a target domain is correctly mapped to content (e.g., the same class) in a source domain. The style-content adaptation system improves unsupervised domain adaptation using independent control over content (e.g., related to a class) as well as style (e.g., related to a domain) to control alignment when translating between the source and target domain. This independent control over content and style can also allow for images to be generated using the style-content adaptation system that contain desired content and/or style.

18 Claims, 10 Drawing Sheets
(3 of 10 Drawing Sheet(s) Filed in Color)

(51) Int. Cl.
G06V 10/82 (2022.01)
G06V 10/44 (2022.01)

(56) References Cited

OTHER PUBLICATIONS

Li, X., Liu, S., Kautz, J., & Yang, M. H. (2018). Learning linear transformations for fast arbitrary style transfer. arXiv preprint arXiv:1808.04537.

Huang, X., & Belongie, S. (2017). Arbitrary style transfer in real-time with adaptive instance normalization. In Proceedings of the IEEE International Conference on Computer Vision (pp. 1501-1510).

Ma, L., Jia, X., Georgoulis, S., Tuytelaars, T., & Van Gool, L. (2018). Exemplar guided unsupervised image-to-image translation with semantic consistency. arXiv preprint arXiv:1805.11145.

Liu, M. Y., Huang, X., Mallya, A., Karras, T., Aila, T., Lehtinen, J., & Kautz, J. (2019). Few-shot unsupervised image-to-image translation. arXiv preprint arXiv:1905.01723.

Huang, X., Liu, M. Y., Belongie, S., & Kautz, J. (2018). Multimodal unsupervised image-to-image translation. In Proceedings of the European Conference on Computer Vision (ECCV) (pp. 172-189).

Karras, T., Laine, S., & Aila, T. (2019). A style-based generator architecture for generative adversarial networks. In Proceedings of the IEEE Conference on Computer Vision and Pattern Recognition (pp. 4401-4410).

Gabbay, A., & Hoshen, Y. (2019). Style Generator Inversion for Image Enhancement and Animation. arXiv preprint arXiv:1906.11880.

LeCun, Y., Bottou, L., Bengio, Y., & Haffner, P. (1998). Gradient-based learning applied to document recognition. Proceedings of the IEEE, 86(11), 2278-2324.

Netzer, Y., Wang, T., Coates, A., Bissacco, A., Wu, B., & Ng, A. Y. (2011). Reading digits in natural images with unsupervised feature learning.

Shen, Y., Gu, J., Tang, X., & Zhou, B. (2019). Interpreting the latent space of gans for semantic face editing. arXiv preprint arXiv:1907.10786.

Zhu, J. Y., Krähenbühl, P., Shechtman, E., & Efros, A. A. (Oct. 2016). Generative visual manipulation on the natural image manifold. In European Conference on Computer Vision (pp. 597-613). Springer, Cham.

Hoshen, Y., & Wolf, L. (2018). Nam: Non-adversarial unsupervised domain mapping. In Proceedings of the European Conference on Computer Vision (ECCV) (pp. 436-451).

Liu, M. Y., Breuel, T., & Kautz, J. (2017). Unsupervised image-to-image translation networks. In Advances in neural information processing systems (pp. 700-708).

Liu, Z., Luo, P., Wang, X., & Tang, X. (2015). Deep learning face attributes in the wild. In Proceedings of the IEEE international conference on computer vision (pp. 3730-3738).

\* cited by examiner

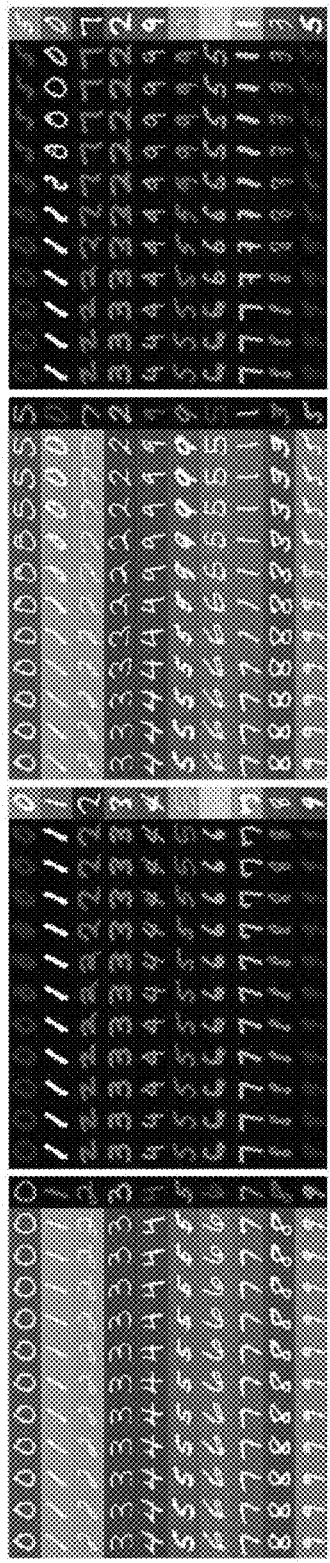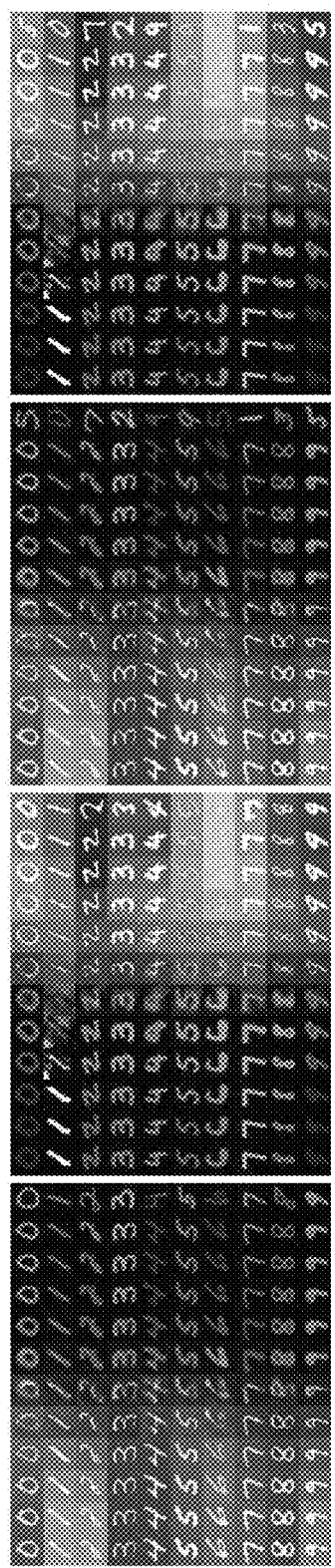
FIG. 7A
FIG. 7B

US 11,776,180 B2

CONTROLLED STYLE-CONTENT IMAGE GENERATION BASED ON DISENTANGLING CONTENT AND STYLE

BACKGROUND

Oftentimes, data scientists (e.g., users) wish to create highly accurate models when generating models that perform a particular task. For instance, the more accurate a model, the better its generated results will be (e.g., classification, image creation, etc.). As an example, a model can be generated for classifying bicycles in images. If the model is poorly trained, it will be unable to accurately classify images for the presence of bicycles. As such, data is carefully selected for training models in an attempt to improve accuracy.

SUMMARY

Embodiments of the present disclosure are directed towards improved models trained using unsupervised domain adaptation. In particular, a style-content adaptation system of the present disclosure provides improved translation during unsupervised domain adaptation by controlling the alignment of conditional distributions of a model during training such that content (e.g., a class) from a target domain is correctly mapped to content (e.g., the same class) in a source domain. The style-content adaptation system can improve unsupervised domain adaptation using independent control over content (e.g., related to a class) as well as style (e.g., related to a domain) to control alignment when translating between the source and target domain. This independent control over content and style can also allow images to be generated using the style-content adaptation system that contain desired content and/or style.

The style-content adaptation system can be implemented using one or more portions of a modified GAN architecture. Such a modified GAN architecture can be comprised of at least a generator portion (e.g., an image generator), a classifier portion (e.g., an image classifier), and a discriminator portion (e.g. joint discriminator). Portions of the style-content adaptation system implemented using the modified GAN architecture can include fully connected layers. Fully connected layers related to the style-content adaptation system can include coarse layers and fine layers. The coarse layers relate to parameters that control lower resolutions in the output, whereas the fine layers can relate to parameters that control higher resolutions in the output. The coarse and fine layers allow for a latent vector (e.g., input into the style-content adaptation system) to be mapped throughout the layers in such a way that an image generated by the system contains content based on an input class label in a style based on an input domain label. In particular, the class label can be used to tweak parameters of the coarse layers while the domain label can be used to tweak the parameters of the fine layers, thus allowing for control over the content of a generated image (e.g. based on the class label) and the style of the generated image (e.g., based on the domain label). Thus, such a style-content adaptation system, trained using unsupervised domain adaptation, allows for an implicit way of disentangling domains from classes.

BRIEF DESCRIPTION OF THE DRAWINGS

The patent or application file contains at least one drawing executed in color. Copies of this patent or patent application publication with color drawing(s) will be provided by the Office upon request and payment of the necessary fee. As the color drawings are being filed electronically via EFS-Web, only one set of the drawings is submitted.

FIGS. 7A-7B illustrate example images generated using a style-content adaptation system, in accordance with embodiments of the present disclosure.

DETAILED DESCRIPTION

Figure 1A:
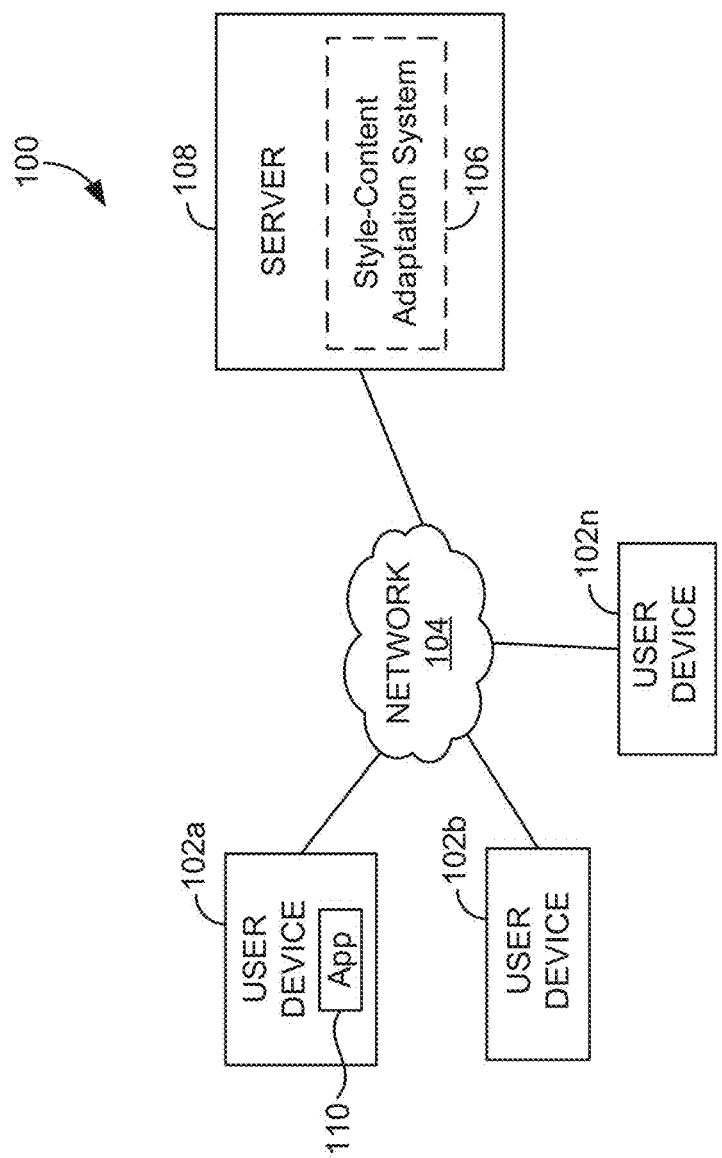
FIG. 1A depicts an example configuration of an operating environment in which some implementations of the present disclosure can be employed, in accordance with various embodiments.

The subject matter of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various terms and phrases are used herein to describe embodiments of the present invention. Some of the terms and phrases used herein are described here, but more details are included throughout the description.

As used herein, the term "style-content adaptation system" refers to a system capable of providing improved translation during unsupervised domain adaptation by controlling the alignment of conditional distributions of a model during training such that content (e.g., a class) from a target domain is correctly mapped to content (e.g., the same class)

in a source domain. The style-content adaptation system can improve unsupervised domain adaptation using independent control over content (e.g., related to a class) as well as style (e.g., related to a domain) to control alignment when translating between the source and target domain. The style-content adaptation system can be implemented using one or more portions of a GAN-based architecture. Such a GAN-based architecture can be comprised of at least a generator portion (e.g., an image generator), a classifier portion (e.g., an image classifier), and a discriminator portion (e.g. joint discriminator).

As used herein, the term "image generator" refers to a neural network trained to generate images. Such an image generator can be related to a GAN architecture. In particular, the image generator can be a generator portion of a GAN that can generate images from an input (e.g., a latent vector. For instance, the image generator can receive an input that comprises a latent vector, a class label, and a domain label. Using the class label and domain label, the image generator can map the latent vector as the latent vector progresses through the neural network (e.g., in relation to network parameters) in such a way that an output generated image contains content based on the class label in a style based on the domain label. The image generator can have fully connected layers that comprise coarse and fine layers. The class label can be used to tweak parameters of the coarse layers while the domain label can be used to tweak parameters of the fine layers. Thus, such a style-content adaptation system allows for an implicit way of disentangling domains from classes, which can then be used to perform image translation.

As used herein, the term "image classifier" refers to one or more neural network trained to classify images. For instance, the image classifier can be used to determine class labels for images in a target domain (e.g., where the class labels are unknown). For instance, during training of the style-content adaptation system, the image classifier can be used to predict class labels (e.g., pseudo labels) for images generated in the target domain. Such pseudo labels can be used during the training of the image generator. For instance, a pseudo label predicted for a generated image can be compared to the class label input to the image generator.

As used herein, the term "joint discriminator" refers to a neural network trained to evaluate aspects of the style-content adaptation system. For instance, the joint discriminator is used to distinguish images generated by the image generator from real images. The joint discriminator can also incorporate an output conditioned on a joint label (e.g., based on a domain label in conjunction with a class size and a class label). For instance, the joint discriminator can evaluate the pseudo label (e.g., predicted by the image classifier) in addition to evaluating whether the image is "real" or "fake". Such information can be used, for example, in guiding the training of the generator. In embodiments related to real images, the joint discriminator can evaluate a class label (e.g., a known ground-truth class label) in addition to evaluating whether the image is "real" or "fake."

The term "latent vector" is used herein to refer to an vector of real numbers that is input into the style-content adaptation system. This latent vector can be used by the image generator of the style-content adaptation system to generate images. The style-content adaptation system allows a latent vector to be mapped throughout layers of the style-content adaptation system in such a way that an image generated by the system contains content based on an input class label in a style based on an input domain label.

The term "coarse layers" is used herein to refer to layers of a neural network that relate to lower resolutions. The coarse layers can be trained using an input of class labels. Using this input class label allows for alignment of coarse layer outputs with blurred real images in early iterations of progressive training of the neural network. Such alignment leads to the coarse layers learning a shared representation for both domains when generating low-resolution images. Thus, the coarse layers can be related to parameters that control lower resolutions in the output that can maintain content based on the class label.

The term "coarse network parameters" is used herein to refer to network parameters that control lower resolutions in an output image. A class label input into the network (e.g., image generator) can be used to tweak coarse layer parameters related to the coarse layers the network. Using the class label, a neural network can map a latent vector as the latent vector progresses through the neural network in relation to coarse network parameters in such a way that a generated image output by the network contains content based on the class label.

The term "fine layers" is used herein to layers of a neural network that relate to higher resolutions. The fine layers can be trained using an input of domain labels. Training the fine layers of the neural network can focus on learning related to style (e.g., domain labels). The Fine layers can be related to parameters that control higher resolutions in the output that can maintain style based on the domain label.

The term "fine network parameters" is used herein to refer to network parameters that control higher resolutions in an output image. A domain label input into the network (e.g., image generator) can be used to tweak fine layer parameters related to the fine layers the network. Using the domain label, a neural network can map a latent vector as the latent vector progresses through the neural network in relation to fine network parameters in such a way that a generated image output by the network contains style based on the domain label.

The term "class label" is used herein to refer to content of interest. A class label can relate to a content variable. Examples of a content variable include a number (e.g., class label: 9) or the presence of eyeglasses. A user can input, or indicate, a class label.

The term "domain label" is used herein to refer to style of interest. A style variable can generally be a domain (e.g., a target domain as indicated using a domain label). An example of such a domain can be perceived gender. A user can input, or indicate, a domain label.

The term "user" is used herein to refer to a marketer, publisher, editor, author, or other person who employs the style-content adaptation system described herein. A user can perform unsupervised domain adaptation and/or generate images by translating an image (e.g., represented using a latent vector) from a source style to a target style while maintaining the class label. A user can designate one or more of the class label and domain label. For instance, a user may select the class label and domain label.

Data scientists (e.g., users) generally desire to create highly accurate models. For instance, the more accurate a model, the better its generated results will be (e.g., classification, image creation, etc.). When a model is poorly trained, the model performs less accurately. However, data is not always available to train an accurate model in a particular domain.

Conventional methods for training models when data is lacking often use unsupervised domain adaptation. Unsupervised domain adaptation allows training data to be obtained from a source domain and used to train a model that can then be implemented in a target domain. In unsupervised domain adaptation, a source domain can be related to a set of data with known labels and a target domain can be related to a set of data that does not have known labels. In particular, unsupervised domain adaptation typically uses annotated images (e.g., images with known labels) from the source domain to train a model (e.g., classifier). This trained model can then be leveraged in a target domain for unannotated images (e.g., images that do not have known labels). However, such approaches that use unsupervised domain adaptation have limitations. For instance, using conventional unsupervised domain adaptation to create models relies on aligning a marginal distribution of data in the source and target domains. When such an alignment fails to correctly occur between the source and target domains during the training of the model, catastrophic errors can be trained into the model, resulting in an inaccurate model. As such, these approaches fail to allow for consistently generating an accurate model in a target domain.

Accordingly, embodiments of the present disclosure present a solution that allows for improved training of models related to unsupervised domain adaptation. In particular, the present disclosure allows for a model to be generated that provides improved translation between a source domain (e.g., used to train the model) and the application of the trained model in a target domain. In particular, improved translation occurs by controlling the alignment of conditional distributions of the model during training such that content (e.g., a class) from the target domain is correctly mapped to content (e.g., the same class) in the source domain. For instance, the model can be used to translate an image (e.g., represented using a latent vector) from a source style to a target style while maintaining the class label. An adaptation system (e.g., a style-content adaptation system) of the present disclosure can improve unsupervised domain adaptation using independent control over a content variable (e.g., related to a class) as well as a style variable (e.g., related to a domain) to control alignment when translating between the source and target domain. The content variable can generally indicate content of interest (e.g., as indicated using a class label). Examples of a content variable include a number (e.g., class label: 9) or the presence of eyeglasses. The style variable can generally be a domain (e.g., a target domain as indicated using a domain label). An example of such a domain can be perceived gender. In this way, the style-content adaptation system can allow for independence of the class and/or domain that will be included in a generated image.

Independent control over factors such as class or domain (e.g., respectively, content or style) also allows a user to control the content and/or style that will be contained in an image generated using the model. In particular, the style-content adaptation system allows images to be generated using a model trained to translate one domain to another domain. Such a model allows an image to be generated in a specified domain (e.g., based on a style variable as indicated using a domain label) while preserving the class of an image related to a content variable (e.g., based on an input class label). This style-content adaptation system allows for known class labels in the source domain to be accurately utilized (e.g., learned) such that the class labels can be applied in an unlabeled target domain when generating images.

Advantageously, such a system can be used to effectively (accurately) generate images with controlled class labels that are in a target domain. Additionally, the system can disentangle domain-dependent variability from content variability. Such disentanglement can allow, for example, image generation in an unlabeled target domain while maintaining an input class label by simply changing the domain label from the source domain to the target domain. As such, the style-content adaptation system can be used to generate images, based on a class label, that are in a target domain.

Portions of a model trained for improved translation between a source and target domain related to the style-content adaptation system can be implemented using one or more neural network. A neural network generally refers to a computational approach using large clusters of connected neurons. For example, a neural network can be comprised of fully connected layers. Neural networks are self-learning and trained rather than explicitly programmed such that a generated output of a neural network reflects a desired result. In embodiments, the style-content adaptation system can be comprised of one or more neural networks based on a generative adversarial neural network (GAN) architecture. For instance, the style-content adaptation system can implement a modified GAN architecture to perform the improved translation between a source and target domain. Such a GAN architecture can be comprised of at least a generator portion (e.g., an image generator), a classifier portion (e.g., an image classifier), and a discriminator portion (e.g. joint discriminator).

To create an improved model using unsupervised domain adaptation, the style-content adaptation system can train the model by controlling the input at various stages during training. To achieve this control, progressive training of the style-content adaptation system can be used. In particular, coarse layers can be used to align an input with coarse layer parameters based on content indicated by a class label. The fine layers can be used to align an input with fine layer parameters based on style indicated by a domain label. Progressive training allows the generator portion and discriminator portion to be trained at different resolutions. For instance, the generator portion and discriminator portion can initially be trained at a low resolution (e.g., 4×4) and then gradually the resolution is increased (e.g., up to 512×512). Training during lower resolutions (e.g., coarse layers of the generator portion) can focus on the style-content adaptation system learning related content (e.g., class labels). Training during higher resolutions (e.g., fine layers of the generator portion) can focus on the style-content adaptation system learning related to style (e.g., domain labels).

In more detail, during training, the generator portion of the style-content adaptation system can receive an input of a class label. In particular, the coarse layers of the generator portion (e.g., related to lower resolutions) can be trained using an input of class labels. Using this input class label allows for alignment of coarse layer outputs with blurred real images in early iterations of the progressive training process. Such alignment leads to the generator portion of the style-content adaptation system learning a shared representation for both domains when generating low-resolution images (e.g., based on the lower resolution coarse layers). To obtain this alignment during training, a domain label is not fed to the coarse layers of a decoder of the generator portion of the style-content adaptation system. Using such training results in the generated low resolution images being aligned to both real source and target samples with corresponding class labels. As such, the generator portion of the style-content adaptation system learns a shared, low-resolution representation of two different domains for a given class label.

Once the progressive training proceeds to training using higher resolutions (e.g., fine layers), a domain label can also be fed into the decoder of the generator portion of the style-content adaptation system. Training using the different inputs of class label and domain label, respectively, in relation to the coarse and fine layers of the fully connected layer allows for the coarse and fine layers to learn from different inputs allowing for disentanglement of domain-dependent variability (e.g., based on a domain label) from content variability (e.g., based on a class label)

These coarse and fine layers of the generator portion of the style-content adaptation system influence the ability of the style-content adaptation system to generate images with controlled class labels that are in a target domain. For instance, a class label can be input to the generator portion (e.g., indicating content of interest). Given the class label $y=e_k \in \mathbb{R}^{1 \times K}$, $k \sim [K]$, $[K]:=\{0, \ldots, K-1\}$ (e.g., input into the generator portion), a content vector can be generated by the generator portion of the style-content adaptation system. This content vector can be represented as $w_c=f([Y, z])$ where $Y=yW_y$ and $[Y, z] \in \mathbb{R}^{1 \times 2N}$. The parameter $W_y \in \mathbb{R}^{K \times N}$ related to such a content vector can be used for matching the content vector to the dimension of the latent vector $z \in \mathbb{R}^{1 \times N}$. In addition, a domain label can be input to the generator portion of the style-content adaptation system (e.g., indicating a domain of interest). Given the domain label, a style vector can be generated and fed into the fine layers of the generator portion. This style vector that is fed to fine layers from the domain label can be represented using the following function: $d=e_m$, $m \sim [M]$: $w_s=f([D, z])$ where $D=dW_d$, $W_d \in \mathbb{R}^{M \times N}$ and $[Y, z] \in \mathbb{R}^{1 \times 2N}$. In some embodiments, the number of domains can be set such that M=2.

In this way, the generator portion of the style-content adaptation system (e.g., g) can be represented as a function of the content vector (e.g., $w_c(z, k)$) and the style vector (e.g., $w_s(z, m)$). As an example, this function can be $g(w_c, w_s)$. The generator portion of the style-content adaptation system can also be represented as a function of the latent vector (e.g., z), the class label (e.g., $k \in [K]$), and the domain label (e.g., $m \in [M]$. As an example, this function can be g(z,k,m).

In addition to the generator portion, the GAN architecture of the style-content adaptation system can also include a classifier portion. This classifier portion can be an image classifier that can be used to generate class labels for images. In particular, for instance, the image classifier can be used to determine class labels for images in the target domain (e.g., where the class labels are unknown). For instance, during training of the style-content adaptation system, the image classifier can be used to predict class labels (e.g., pseudo labels) for images generated in the target domain. Such pseudo labels can be used during the training of the generator portion of the style-content adaptation system. For instance, a pseudo label predicted for a generated image can be compared to the class label input to the generator portion. Errors between the pseudo label and input class label can be used to correct loss in the style-content adaptation system, as discussed in further detail below.

The style-content adaptation system can further include a discriminator portion. The discriminator portion can be used evaluate the images generated by the style-content adaptation system for realism or authenticity (e.g., the discriminator decides whether an image is "real" or "fake"). The discriminator portion of the style-content adaptation system can be a joint discriminator. Such a joint discriminator attempts to distinguish images generated by the generator portion of the style-content adaptation system from real images. The joint discriminator can also incorporate an output conditioned on a joint label (e.g., based on a domain label in conjunction with a class size and a class label). In particular, in embodiments related to an image generated by the generator portion of the style-content adaptation system, the discriminator portion can evaluate the pseudo label (e.g., predicted by the image classifier) in addition to evaluating whether the image is "real" or "fake. Such information can be used, for example, in guiding the training of the generator portion. In embodiments related to real images, the discriminator portion can evaluate a class label (e.g., a known ground-truth class label) in addition to evaluating whether the image is "real" or "fake.

Using such a GAN architecture for the style-content adaptation system allows for a domain of a generated image to be determined based on a domain label input into the generator portion of the style-content adaptation system. In addition, such a GAN architecture allows for a class label of a generated image to be determined based on a class label input into the generator portion of the style-content adaptation system. In particular, the generator portion can be conditioned on both the domain label and class label. To achieve such conditioning, as previously discussed, the class label can be used to tweak parameters of the coarse layers while the domain label can be used to tweak parameters of the fine layers. Thus, such a style-content adaptation system allows for an implicit way of disentangling domains from classes, which can then be used to perform image translation.

Upon completion of training of the style-content adaptation system, the trained generator portion of the style-content adaptation system can be used to generate images. Further, the trained image classifier can be used to label images from both the source and target domains. In embodiments, upon completion of training, just the generator portion of the style-content adaptation system can be used (e.g., to generate images based on an input class label and domain label). In other embodiments, upon completion of training, just the image classifier can be used (e.g., to determine a class label for images in the source and/or target domains). In still further embodiments, upon completion of training, the generator portion of the style-content adaptation system can be used (e.g., to generate images based on an input class label and domain label) and then the image classifier can be used (e.g., to determine a class label for the generated image).

In this way, the style-content adaptation system can be used to generate images in a target domain while maintaining an input class label. In particular, a latent vector can be input into the style-content adaptation system along with a domain label and a class label. The coarse layers of a generator portion of the style-content adaptation system can maintain content based on the class label and the fine layers of the generator portion maintain a style based on the domain label. Upon generating the image (e.g., using the generator portion of the style-content adaptation system), in some embodiments, the style-content adaptation system can generate a class label for the image (e.g., using the image classifier).

FIG. 1A depicts an example configuration of an operating environment in which some implementations of the present disclosure can be employed, in accordance with various embodiments. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory as further described with reference to FIG. 9.

It should be understood that operating environment 100 shown in FIG. 1A is an example of one suitable operating environment. Among other components not shown, operating environment 100 includes a number of user devices, such as user devices 102a and 102b through 102n, network 104, and server(s) 108. Each of the components shown in FIG. 1A may be implemented via any type of computing device, such as one or more of computing device 900 described in connection to FIG. 9, for example. These components may communicate with each other via network 104, which may be wired, wireless, or both. Network 104 can include multiple networks, or a network of networks, but is shown in simple form so as not to obscure aspects of the present disclosure. By way of example, network 104 can include one or more wide area networks (WANs), one or more local area networks (LANs), one or more public networks such as the Internet, and/or one or more private networks. Where network 104 includes a wireless telecommunications network, components such as a base station, a communications tower, or even access points (as well as other components) may provide wireless connectivity. Networking environments are commonplace in offices, enterprise-wide computer networks, intranets, and the Internet. Accordingly, network 104 is not described in significant detail.

It should be understood that any number of user devices, servers, and other components may be employed within operating environment 100 within the scope of the present disclosure. Each may comprise a single device or multiple devices cooperating in a distributed environment.

User devices 102a through 102n can be any type of computing device capable of being operated by a user. For example, in some implementations, user devices 102a through 102n are the type of computing device described in relation to FIG. 9. By way of example and not limitation, a user device may be embodied as a personal computer (PC), a laptop computer, a mobile device, a smartphone, a tablet computer, a smart watch, a wearable computer, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device.

The user devices can include one or more processors, and one or more computer-readable media. The computer-readable media may include computer-readable instructions executable by the one or more processors. The instructions may be embodied by one or more applications, such as application 110 shown in FIG. 1A. Application 110 is referred to as a single application for simplicity, but its functionality can be embodied by one or more applications in practice. As indicated above, the other user devices can include one or more applications similar to application 110. As an example, application 110 can be any one of ADOBE PHOTOSHOP, ADOBE ILLUSTRATOR, ADOBE CAPTURE, ADOBE BEHANCE, and ADOBE INDESIGN.

The application 110 may generally be any application capable of facilitating the exchange of information between the user devices and the server(s) 108 in carrying out style-content adaptation. In some implementations, the application 110 comprises a web application, which can run in a web browser, and could be hosted at least partially on the server-side of environment 100. In addition, or instead, the application 110 can comprise a dedicated application, such as an application having image processing functionality. In some cases, the application 110 is integrated into the operating system (e.g., as a service). It is therefore contemplated herein that "application" be interpreted broadly.

In accordance with embodiments herein, the application 110 facilitates style-content adaptation. In embodiments, a class label and a domain label are received. The class and domain labels can be selected or input in any manner. For example, a user may select the class and/or domain label. Such domain and/or class labels can be selected from, for example, a repository, for example, a repository stored in a data store accessible by a network or stored locally at the user device 102a. Based on the input class label and a domain label, (e.g., provided via a user device or server), an image can be generated. For instance, a latent vector can be input, along with the class label and a domain label into a style-content adaptation system. From these inputs, the style-content adaptation system can generate and/or classify a generated image. The generated image can contain content based on the input class label and in a style based on the domain label. The generated image can be output to a user, for example, to the user via the user device 102a. For instance, in one embodiment, the generated image can be displayed via a display screen of the user device.

As described herein, server 108 can facilitate style-content adaptation via style-content adaptation system 106. Server 108 includes one or more processors, and one or more computer-readable media. The computer-readable media includes computer-readable instructions executable by the one or more processors. The instructions may optionally implement one or more components of style-content adaptation system 106, described in additional detail below.

Portions of style-content adaptation system 106 can train and/or operate one or more machine learning models. For instance, style-content adaptation system 106 can include an image generator, an image classifier, and/or a joint discriminator. Once trained, the image generator can generate images using input latent vectors, class labels, and domain labels. These generated images can contain content based on an input class label and in a style based on an input domain label.

For cloud-based implementations, the instructions on server 108 may implement one or more components of style-content adaptation system 106, and application 110 may be utilized by a user to interface with the functionality implemented on server(s) 108. In some cases, application 110 comprises a web browser. In other cases, server 108 may not be required, as further discussed with reference to FIG. 1B. For example, the components of style-content adaptation system 106 may be implemented completely on a user device, such as user device 102a. In this case, style-content adaptation system 106 may be embodied at least partially by the instructions corresponding to application 110.

Figure 1B:
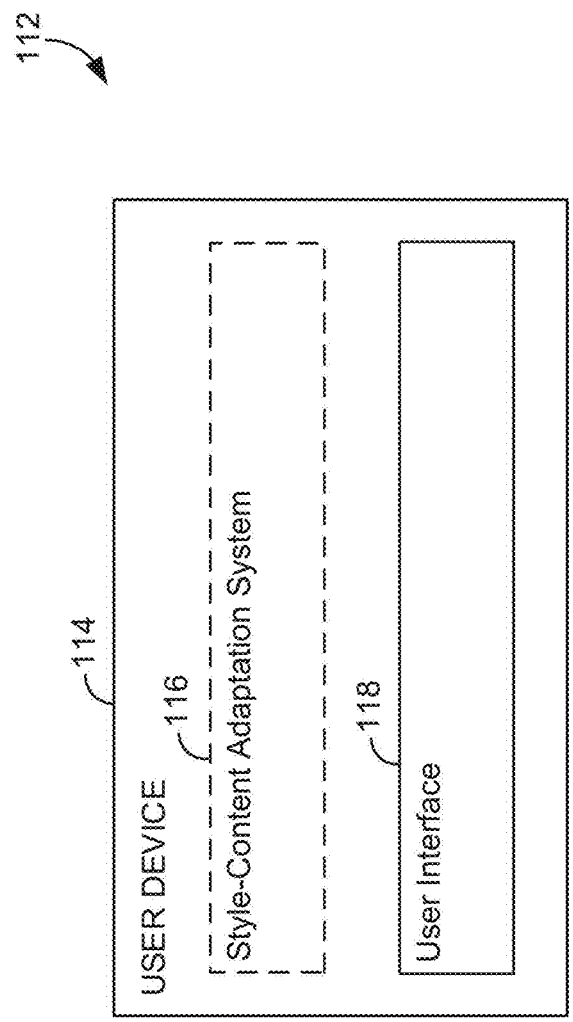
FIG. 1B depicts another example configuration of an operating environment in which some implementations of the present disclosure can be employed, in accordance with various embodiments.

Referring to FIG. 1B, aspects of an illustrative style-content adaptation system are shown, in accordance with various embodiments of the present disclosure. FIG. 1B depicts a user device 114, in accordance with an example embodiment, configured to allow for image generation of images that contain content based on an input class label and in a style based on an input domain label using a style-content adaptation system 116. The user device 114 may be the same or similar to the user device 102a-102n and may be configured to support the style-content adaptation system 116 (as a standalone or networked device). For example, the user device 114 may store and execute software/instructions to facilitate interactions between a user and the style-content adaptation system 116 via the user interface 118 of the user device.

A user device can be utilized by a user to perform image generation based on input class and domain labels. In particular, a user can select and/or input a desired class label utilizing user interface 118 (e.g., indicating desired content to contain in an image). Further, a user can select and/or input a desired domain label utilizing user interface 118 (e.g., indicating desired style to contain in an image). Such a class and/or domain label can be selected or input in any manner. The user interface may facilitate the user accessing the class and/or domain label(s). As can be appreciated, images can be generated without specific user selection of one or more of the class and/or domain label(s). Based on the input the class and domain labels, style-content adaptation system 116 can be used to generate an image in a target domain while maintaining an input class label using various techniques, some of which are further discussed below. User device 114 can also be utilized for displaying the generated image.

Figure 2:
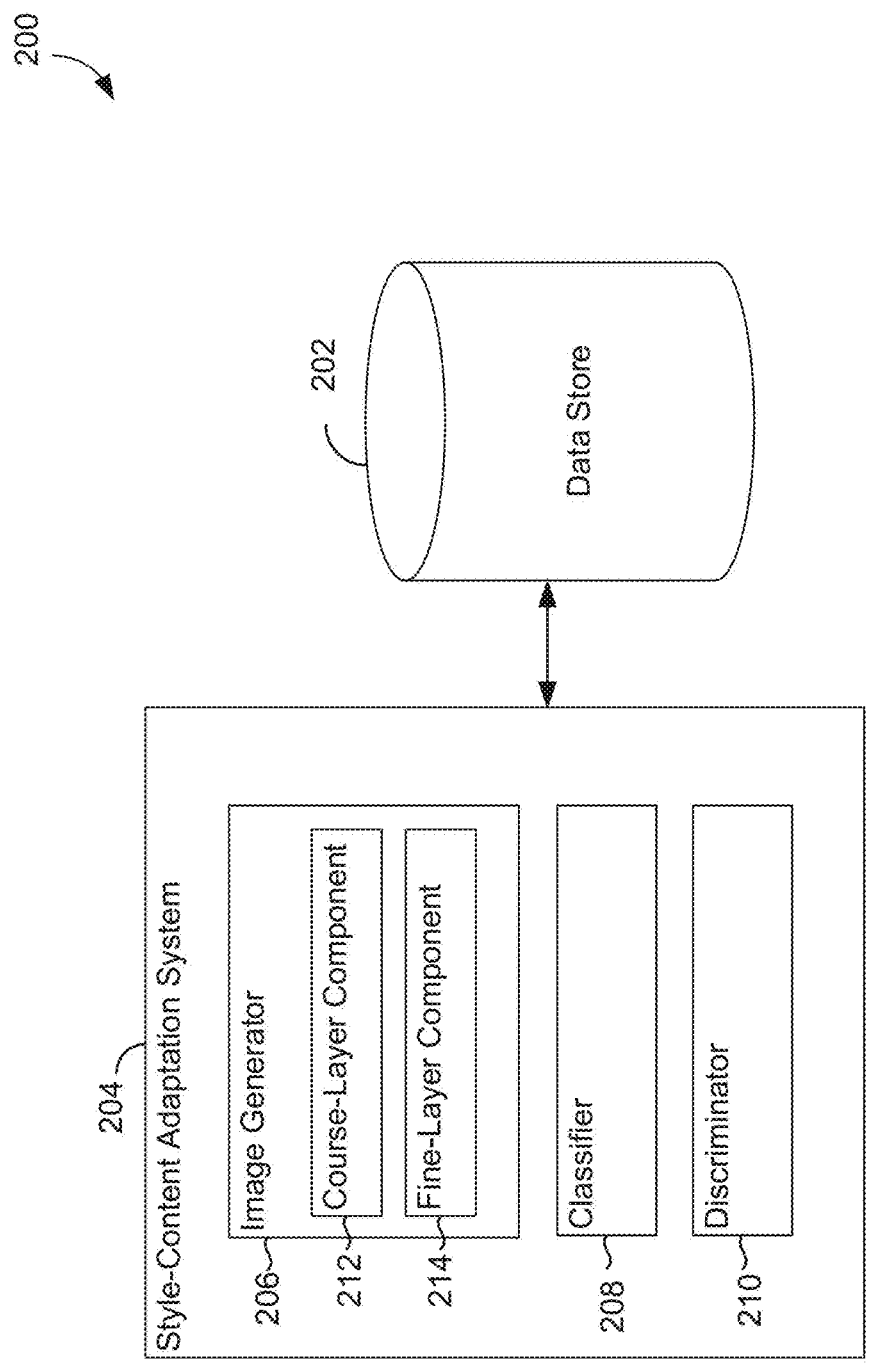
FIG. 2 depicts a further example configuration of an operating environment in which some implementations of the present disclosure can be employed, in accordance with various embodiments of the present disclosure.

Referring to FIG. 2, aspects of an illustrative style-content adaptation environment 200 are shown, in accordance with various embodiments of the present disclosure. As depicted, style-content adaptation system 204 includes image generator 206, classifier 208, and discriminator 210. The foregoing aspects of style-content adaptation system 204 can be implemented, for example, in operating environment 100 of FIG. 1A and/or operating environment 112 of FIG. 1B. In particular, these aspects may be integrated into any suitable combination of user devices 102a and 102b through 102n and server(s) 106 and/or user device 114. While the various aspects are depicted as separate, it should be appreciated that a single component can perform the functionality of all aspects. Additionally, in implementations, the functionality of each aspect can be performed using additional engines and/or components. Further, it should be appreciated that the functionality of the aspects can be provided by a system separate from the style-content adaptation system.

As shown, a style-content adaptation system can operate in conjunction with data store 202. Data store 202 can store computer instructions (e.g., software program instructions, routines, or services), data, and/or models used in embodiments described herein. In some implementations, data store 202 can store information or data received via the various engines and/or components of image generator 206 and provide various aspects, engines, and/or components with access to that information or data, as needed. Although depicted as a single component, data store 202 may be embodied as one or more data stores. Further, the information in data store 202 may be distributed in any suitable manner across one or more data stores for storage (which may be hosted externally). In embodiments, data stored in data store 202 can include images generated by the style-content adaptation system. Such images can be input into data store 202 from a remote device, such as from a server or a user device. Such images can then be classified using the style-content adaptation system. These classifications can be stored in conjunction with the images.

Data store 202 can also be used to store one or more machine learning models during training and/or upon completion of training. Such machine learning models can include an image generator, an image classifier, and a joint discriminator.

Style-content adaptation system 204 can generally be used for generating images in a target domain while maintaining an input class label. Specifically, the style-content adaptation system can train and/or use machine learning models to generate images that contain content based on an input class label that also contain a style based on an input domain label. In particular, portions of such a style-content adaptation system can be implemented using one or more neural network. A neural network generally refers to a computational approach using large clusters of connected neurons. Neural networks are self-learning and trained rather than explicitly programmed such that a generated output of a neural network reflects a desired result.

In accordance with embodiments described herein, the style-content adaptation system can be run using, for example, a neural network-based architecture. In particular, the style-content adaptation system can be comprised of one or more neural networks based on a generative adversarial neural network (GAN) architecture. For instance, the style-content adaptation system can be comprised of an image generator, an image classifier, and a joint discriminator. In more detail, the style-content adaptation system can implement a modified GAN architecture in a multi-domain setting. Such a modified-GAN can be used to perform improved translation between a source and target domain during unsupervised domain adaptation. Such a GAN architecture can be comprised of image generator (e.g., image generator 206), an image classifier (e.g., classifier 208), and a joint discriminator (e.g., discriminator 210).

Image generator 206 can be used to generate images based on a class label that are in a target domain. In particular, image generator 206 can be used to run an image generator (e.g., related to a neural network) that can generate images from an input (e.g., a latent vector). In particular, an input can be fed into fully connected layers of the image generator. For instance, the image generator 206 can receive an input that comprises a latent vector, a class label (e.g., content variable), and a domain label (e.g., style variable). Using the class label and domain label, the image generator can map the latent vector as the latent vector progresses through the neural network (e.g., in relation to network parameters) in such a way that a generated image output by the network contains content based on the class label in a style based on the domain label.

In more detail, given the class label $y=e_k \in \mathbb{R}^{1 \times K}$, $k \sim [K]$, $[K]:=\{0, \ldots, K-1\}$, a content vector can be $w_c=f([Y, z])$ where $Y=yW_y$ and $[Y, z] \in \mathbb{R}^{1 \times 2N}$. The parameter $W_y \in \mathbb{R}^{K \times N}$ can be used for matching the dimension of the latent vector $z \in \mathbb{R}^{1 \times N}$. In addition, given a domain label, a style vector can be fed to fine layers and represented using the following function: $d=e_m$, $m \sim [M]$: $w_s=f([D, z])$ where $D=dW_d$, $W_d \in \mathbb{R}^{M \times N}$ and $[Y, z] \in \mathbb{R}^{1 \times 2N}$. The number of domains can be set such that $M=2$.

The functionality of the image generator can be represented in relation to the content vector and the style vector. In particular, the image generator (e.g., g) can be represented as a function of the content vector (e.g., $w_c(z,k)$) and the style vector (e.g., $w_s(z, m)$). As an example, this function can be $g(w_c, w_s)$. The generator can also be represented as a function of the latent vector (e.g., z), the class label (e.g., $k \in [K]$), and the domain label (e.g., $m \in [M]$. As an example, this function can be $g(z, k, m)$.

In further detail, fully connected layers of the image generator can be used to learn Adaptive Instance Normalization (AdaIN) parameters. AdaIN parameters can be related to one or more layers of the image generator neural network that align a mean and/or variance of features related to content with features related to style. Such AdaIN parameters can be learned by a decoder portion of the image generator. In particular, each AdaIN layer can apply an affine transformation to a feature at layer i to generate a transform feature. An example of such a transformed feature can be represented as:

$$AdaIN(x_i, z) = \sigma_i \frac{x_i \mu(x_i)}{\sigma(x_i)} + \mu_i.$$

In such an equation, $x_i$ is initially standardized by applying Instance Normalization (IN) and then the learned $\sigma_i$ and $\mu_i$ can be applied to set the mean and dispersion parameter. In more detail, $\sigma=[\sigma_1, \ldots, 94_L]$ and $\mu=[\mu_1, \ldots, \mu_L]$ can be learned from a fully connected network. Such a decoder can have several AdaIN layers whose parameters can be used to modify a generated image. In embodiments, to learn AdaIN parameters, a constant latent input can be updated with the same minimax loss as the rest of the decoder instead of using a latent vector as input to the decoder.

The fully connected layers of the image generator can include various layers. For example, fully connected layers of the image generator can be represented as f:w=[σ, μ]= $[w_i, \ldots, w_L]=f(z)$. In such equations, L can be the number of AdaIN layers. In embodiments, the fully connected layers of the image generator can include coarse layers and fine layers. Coarse layers can be related to parameters that control lower resolutions in the output, whereas fine layers can be related to parameters that control higher resolutions in the output. In particular, in relation to the AdaIN layers, the two different types of layers can correspond to two different types of AdaIN parameters. First, coarse-layer AdaIN parameters can refer to the parameters that control lower resolutions in the output. As an example, such coarse-layer AdaIN parameters can be represented as $\sigma=[\sigma_1, \ldots, \sigma_{L/2}]$ and $\mu=[\mu_1, \ldots, \sigma_{L/2}]$. Second, fine layer AdaIN parameters can refer to the parameters that control higher resolutions in the output. As an example, such fine layer AdaIN parameters can be represented as $\sigma=[\sigma_1, \ldots, \sigma_{L/2+1}]$ and $\mu=[\mu_1, \ldots, \mu_{L/2+1}]$.

These coarse and fine layers of the image generator influence the ability of the style-content adaptation system to generate images with controlled class labels that are in a target domain. For instance, a class label can be input to the image generator (e.g., indicating content of interest). Given the class label $y=e_k \in \mathbb{R}^{1 \times K}$, k~[K], [K]:={0, \ldots, K−1} (e.g., input into the image generator), a content vector can be generated by the image generator. This content vector can be represented as $w_c=f([Y, z])$ where $Y=yW_y$ and $[Y, z] \in \mathbb{R}^{1 \times 2N}$. The parameter $W_y \in \mathbb{R}^{K \times N}$ related to such a content vector can be used for matching the content vector to the dimension of the latent vector $z \in \mathbb{R}^{1 \times N}$. In addition, a domain label can be input to the image generator (e.g., indicating a domain of interest). Given the domain label, a style vector can be generated and fed into the fine layers of the image generator. This style vector that is fed to fine layers from the domain label can be represented using the following function: $d=e_m$, m~[M]:$w_s=f([D, z])$ where $D=dW_d$, $W_d \in \mathbb{R}^{M \times N}$ and $[Y, z] \in \mathbb{R}^{1 \times 2N}$. In some embodiments, the number of domains can be set such that M=2.

As depicted, image generator 206 includes coarse-layer component 212 and fine-layer component 214. The foregoing components of image generation 206 can be implemented, for example, in operating environment 100 of FIG. 1A and/or operating environment 112 of FIG. 1B. In particular, those components may be integrated into any suitable combination of user devices 102a and 102b through 102n and server(s) 108 and/or user device 114. While the various components are depicted as separate components, it should be appreciated that a single component can perform the functionality of all components. Additionally, in implementations, the functionality of the components can be performed using additional components and/or engines. Further, it should be appreciated that the functionality of the components can be provided by aspects separate from the image generator.

Coarse-layer component 212 can be used during progressive training of the image generator. Initially, during training in low resolutions, the image generator can receive an input of a class label. In particular, the coarse layers of the image generator can be trained using an input of class labels. Using this input class label allows for alignment of coarse layer outputs with blurred real images in early iterations of the progressive training process. Such alignment leads to the image generator learning a shared representation for both domains when generating low-resolution images (e.g., based on the low resolution coarse layers). To obtain this alignment during training, the domain label d is not fed to the coarse layers of the decoder of the image generator. For instance, when loss is determined for image generator, generated low resolution images are aligned to both real source and target samples with corresponding class labels. As such, the image generator learns a shared, low-resolution representation of two different domains for a given class label.

Fine-layer component 214 can then be used during progressive training of the image generator once higher resolutions are being used. In particular, the fine-layer component 214 can be used once the progressive training proceeds to using fine layers, such that a domain label can also be fed into the decoder of the image generator. Training using the different inputs of class label and domain label, respectively, in relation to the coarse and fine layers of the fully connected layer allows for the coarse and fine layers to learn from different inputs allowing for disentanglement of domain-dependent variability (e.g., based on a domain label) from content variability (e.g., based on a class label).

While training the image generator using coarse-layer component 212 and fine-layer component 214, different types of loss can be evaluated to determine any errors or discrepancies therebetween. For instance, errors can be determined by evaluating conditional GAN loss. In particular, conditional GAN loss can be used where the label space is the Cartesian product of the domain and class label sets to train the image generator to generate images with controlled domain and class labels. In addition, discriminator loss can be used because class labels in the target domain are unknown so predicted class labels (e.g., from an image classifier) are used as pseudo-labels during training. Various other types of loss can also be used, as previously discussed.

Classifier 208 can be used to run an image classifier that can predict class labels. This image classifier can be used to generate class labels for images. In particular, for instance, the image classifier can be used to determine class labels for images in the target domain (e.g., where the class labels are unknown). For instance, during training of the style-content adaptation system, the image classifier can be used to predict class labels (e.g., pseudo labels) for images generated in the target domain. Such pseudo labels can be used during the training of the image generator. For instance, a pseudo label predicted for a generated image can be compared to the class label input to the image generator.

Discriminator 210 can be used to run a joint discriminator that can evaluate generated images for realism or authenticity. For instance, the joint discriminator is used to distinguish images generated by the image generator from real images. The joint discriminator can also incorporate an output conditioned on a joint label (e.g., based on a domain label in conjunction with a class size and a class label). In particular, in embodiments related to an image generated by the image generator, the joint discriminator can evaluate the pseudo label (e.g., predicted by the image classifier) in addition to evaluating whether the image is "real" or "fake." Such information can be used, for example, in guiding the training of the generator. In embodiments related to real images, the joint discriminator can evaluate a class label (e.g., a known ground-truth class label) in addition to evaluating whether the image is "real" or "fake."

To train style-content adaptation system 204, image generator 206 and discriminator 210 can be run in conjunction such that an image generator (e.g., run using image generator 206) and joint discriminator (e.g., run using discriminator 210) can undergo training. In particular, the image generator and joint discriminator can progressively learn shared representations of classes with differentiated domain characteristics in an unsupervised fashion. Progressive training allows the image generator and joint discriminator to be trained at different resolutions. For instance, the image generator and joint discriminator can initially be trained at a low resolution (e.g., 4×4) and then gradually the resolution is increased (e.g., up to 512×512).

Initially, during training, the image generator can receive an input of a class label. In particular, coarse-layer component 212 of image generator 206 can be used to train the coarse layers of the image generator using an input of class labels. Using this input class label allows for alignment of coarse layer outputs with blurred real images in early iterations of the progressive training process. Such alignment leads to the image generator learning a shared representation for both domains when generating low-resolution images (e.g., based on the low resolution coarse layers). To obtain this alignment during training, the domain label d is not fed to the coarse layers of the decoder of the image generator. For instance, when loss is determined for image generator, generated low resolution images are aligned to both real source and target samples with corresponding class labels. As such, the image generator learns a shared, low-resolution representation of two different domains for a given class label. Once the progressive training proceeds to using fine layers, fine-layer component 214 can be used to receive a domain label. Training using the different inputs of class label and domain label, respectively, in relation to the coarse and fine layers of the fully connected layer allows for the coarse and fine layers to learn from different inputs allowing for disentanglement of domain-dependent variability (e.g., based on a domain label) from content variability (e.g., based on a class label).

In addition, during this progressive training, the image generator (e.g., run using image generator 206) and the joint discriminator (e.g., run using discriminator 210) can be trained in an adversarial manner, in conjunction with an image classifier (e.g., run using classifier 208). Such adversarial training means that the image generator and the joint discriminator are trained simultaneously as a min/max optimization. Further, the image classifier can be trained to minimize loss, such that the class labels generated by the image classifier are accurate. In particular, the image generator can try to generate real images from the input vectors while the joint discriminator tries to distinguish images output by the generator as real or fake images. Generally, "real" images can be defined as images that are realistic and "fake" images can be defined as images that are not realistic. Further, with relation to class labels, the joint discriminator has an output based on the overall class (e.g., number of class labels). For instance, if K is the size of the overall class, the output of the joint discriminator can have a 2K dimensional output from which one is selected conditioned on the joint label. As an example, given that K=10, the source and/or target "9" can have a joint label of j=9(19), such that the jth index of the joint discriminator output can be used to determine whether an image is "real" or "fake." When the joint discriminator is performing minimization during the min/max optimization in relation to an unlabeled image in the target domain, a pseudo label provided using the image classifier can be used.

During training of style-content adaptation system 204, different types of loss can be evaluated to determine any errors or discrepancies therebetween, as described in more detail below. Errors can include inaccuracies, flaws, variations, and/or divergences between training output and a desired output, often referred to as the ground-truth or output if the style-content adaptation system was perfectly trained. Such errors can be determined by calculating the min/max optimization between the image generator and joint discriminator and/or comparing parameters of the training output and the ground-truth of the image classifier to find a loss function(s). In some embodiments, portions of the style-content adaptation system can be updated by feeding errors back through the system so the algorithm can adjust network connections in order to reduce the value of the error. In some embodiments, such loss can be determined using discriminator 210. In other embodiments, such loss can be determined using discriminator 210 in conjunction with image generator 206 and/or classifier 208.

Adjusting the style-content adaptation system to correct for errors can be accomplished by changing at least one node parameter. The portions (e.g., image generator, image classifier, and/or joint discriminator) of the style-content adaptation system can comprise a plurality of interconnected nodes with a parameter, or weight, associated with each node. Each node can receive inputs from multiple other nodes and can activate based on the combination of all these inputs, for example, when the sum of the input signals is above a threshold. The parameter can amplify or dampen the input signals. For example, a parameter could be a value between zero and one. The inputs from each node can be weighted by a parameter, or in other words, multiplied by the parameter, prior to being summed. In this way, the parameters can control the strength of the connection between each node and the subsequent node. For example, for a given node, a first parameter can provide more weight to an input from a first node, while a second parameter can provide less weight to an input from a second node. As a result, the parameters strengthen the connection to the first node, making it more likely that a signal from the first node will cause the given node to activate, while it becomes less likely that inputs from the second node will cause activation.

Errors can be determined, for example, using loss functions. Loss functions can comprise min/max optimization between the image generator and joint discriminator (e.g., conditional GAN loss) and/or comparing parameters of the training output and the ground-truth of the image classifier (e.g., classification loss). Other types of loss functions that can be used include, target entropy loss, regularization loss, domain adversarial loss, etc. Errors determined using loss functions are used to minimize loss in the style-content adaptation system by backwards propagation of such errors through the system.

In embodiments, errors can be determined by evaluating conditional GAN loss. In particular, to train the system to generate images with controlled domain and class labels, a conditional GAN loss can be used where the label space is the Cartesian product of the domain and class label sets. For instance, conditional GAN loss can be represented using the function: $[K]\times[M]$. Such a function can be denoted as a set of scalars, for instance, $[MK]=\{0, \ldots, MK-1\}$. A joint label can be defines as $j=mK+k \in [MK]$ for the given class label k and domain label m. As discussed previously, the joint discriminator tries to distinguish fake and real images with the label $j \in [MK]$.

Because class labels in the target domain are unknown, predicted class labels (e.g., from an image classifier) can be used as pseudo-labels for determining discriminator loss during training. In particular, in the target domain, the class labels k (and thus joint labels j) are not known, pseudo-labels can be used. Such pseudo-labels can be generated by an image classifier. The image classifier can be trained using labeled image from both the source and target domains. For example, $$k(x^t) = \arg\max_k h(x^t)[k] \qquad \text{Equation (1)}$$

In one embodiment, the number of domains can be set to two (e.g., M=2 where m=0 for the source domain and m=1 for the target domain). Non-saturating GAN loss can be used as a conditional GAN loss where the generator (e.g., g) solves the following optimization:

$$\min_g \mathbb{E}_{P(z,k,m)} \phi(-\psi(g(z, k, m)))[mK + k] \qquad \text{Equation (2)}$$

In such an optimization, $$P(z, k, m) = N(z-0, I)\frac{I(k < K)}{K}\frac{I(m < M)}{M},$$

I can be an indicator function and $\phi(x)=\text{softplus}(x)=\log(\exp(x)+1)$.

The joint discriminator (e.g., $\psi$) competes with the generator (e.g., g) by solving the following optimization:

$$\min_\psi \mathbb{E}_{P(z,k,m)} \phi(\psi(g(z, k, m)))[mK + k] + \qquad \text{Equation (3)}$$
$$\mathbb{E}_{(x^s,e_k)\sim P^s} \phi(-\psi(x^s)[k]) + \mathbb{E}_{x^t\sim P_x^t} \phi(-\psi(x^t)[K + k(x^t)])$$

In such an optimization, K can be added to $k(x^t)$ from Equation 1. Such an addition can be performed because the last K entries of the discriminator output are devoted to the target samples.

In embodiments, errors can also be determined by evaluating classification loss. Classification loss can be determined with reference to either the source domain or the target domain. In particular, classification loss can be used to train the classifier (e.g., h). For instance, classification loss can be minimized based on generated images because the target domain images are generated with controlled class labels. Such classification loss can be defined as, $$L_{tc}(h,g)=\mathbb{E}_{P(z,k)} l_{CE}(h(x),y) \qquad \text{Equation (4)}$$

For source domain samples, generated images do not need to be used for minimizing a classification loss as the class labels of the real images are known. In such a case, the classification loss can be defined as, $$L_{sc}(h)=\mathbb{E}_{P(x,y)\sim P^s} l_{CE}(h(x),y) \qquad \text{Equation (5)}$$

Domain adversarial loss can also be determined for the hidden layers of the image classifier (e.g., h). To minimize loss for aligning hidden layer distributions of domains (e.g., two domains: source and target), a small domain discriminator can be used: $\omega(x) \in \mathbb{R}^2$ where loss can be represented as: $L_{dann}(\omega, \theta)=\mathbb{E}_{x\sim p_t^x} l_{CE}(\omega(\theta(x))), [0,1])+\mathbb{E}_{x\sim p_t^x} l_{CE}(\omega(\theta(x))), [0,1])$, which can be optimized in a min/max operation such as $\min_\omega \max_\theta L_{dann}(\omega, \theta)$.

In embodiments, errors can also be determined by evaluating other types of loss. For instance, entropy minimization can be applied for prediction on the unlabeled target domain. In particular, the image classifier can be trained to minimize target entropy loss. An example equation that can be used for such loss follows as: $L_{te}(h)=\mathbb{E}_{x\sim p_t^x} l_E(h(x))$, where $l_E(h(x)):=-\langle(h(x), \log h(x)\rangle$. Virtual adversarial training (VAT) can also be applied (e.g., to satisfy a Lipschitz condition such that minimizing entropy satisfies a cluster assumption). VAT can make a second-order approximation for adversarial input perturbations $\Delta x$ and proposes the following approximation to adversarial noise for each input x:

$$\Delta x \approx \epsilon_x \frac{r}{\|r\|_2}$$

subject to $r=\nabla_{\Delta x} l_{CE} h(x)$, $h(x+\Delta x)|_{\Delta x=\xi d}$ where $d\sim N(0,1)$. Further, this entropy minimization can be applied as a regularization. In particular, regularization loss can then be determined. This regularization loss can be represented as:

$$\ell_{VAT}(h(x)) := \ell_{CE}\left(h(x), h\left(x + \epsilon_x \frac{r}{\|r\|_2}\right)\right).$$

subject to $r=\nabla_{\Delta x} l_{CE} h(x)$, $h(x+\Delta x)|_{\Delta x=\xi d}$ for one input sample x. In this way, a target VAT loss can be given as: $L_{tVAT}(h)=\mathbb{E}_{x\sim p_t^x} l_{VAT}(h(x))$.

The process of training can be repeated for a sufficiently large number of cycles. For instance, training can continue until the joint discriminator can no longer determine that generated images differ from real images. In some embodiments, a predefined number of epochs can be used for training the style-content adaptation system. Such a predefined number of epochs can balance the tradeoff between time and computational resources using during training and the accuracy of the functioning style-content adaptation system.

Upon completion of training of the style-content adaptation system, the trained image generator can be used to generate images (e.g., run using image generator 206). Further, the trained image classifier can be used to label images from both the source and target domains (e.g., run using classifier 208). In embodiments, upon completion of training, just the image generator can be used (e.g., to generate images based on an input class label and domain label). In other embodiments, upon completion of training, just the image classifier can be used (e.g., to determine a class label for images in the source and/or target domains). In still further embodiments, upon completion of training, the image generator can be used (e.g., to generate images based on an input class label and domain label) and then the image classifier can be used (e.g., to determine a class label for the generated image).

In some embodiments, style-content adaptation system 204 can be used to invert a latent vector from a real image. For instance an encoder network can invert a latent vector from a real image by mapping the real image into a latent space. Then an entire network can be trained using image reconstruction loss (e.g., $$\min_{g,f,\phi} \|g(f(\phi(x))) - x\|).$$

In such an equation x can be the input real image and g, f and $\phi$ can be network parameters. In some instances, variational auto-encoder (VAE) loss can be used to train such a network with both real images and samples latent vectors from normal distributions.

Figure 3:
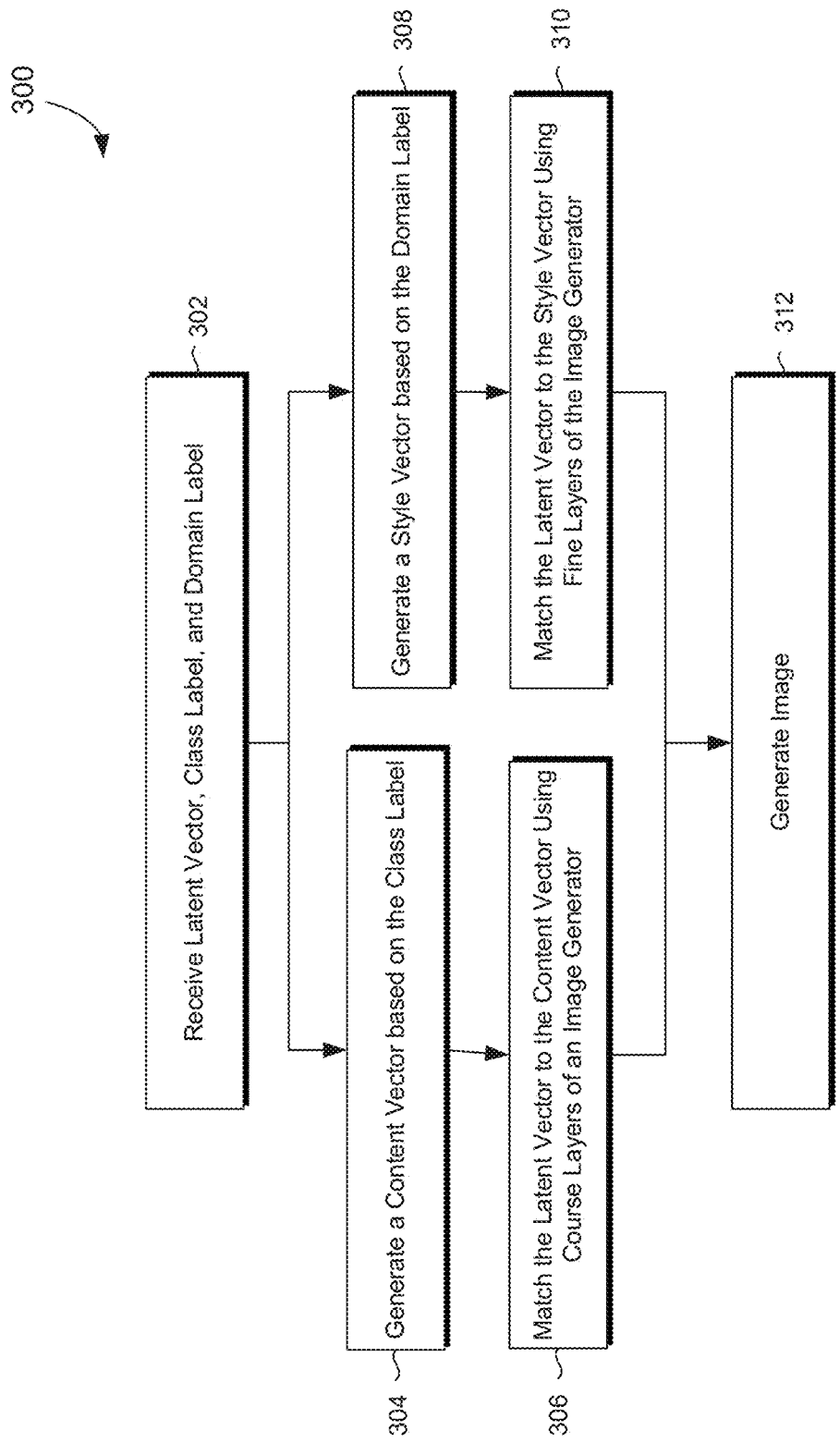
FIG. 3 depicts a process flow showing an embodiment of a method for generating images with controlled class labels that are in a target domain, in accordance with embodiments of the present disclosure.

With reference to FIG. 3, a process flow is provided showing an embodiment of method 300 for generating images with controlled class labels that are in a target domain, in accordance with embodiments of the present disclosure. Aspects of method 300 can be performed, for example, by style-content adaptation system 204, as illustrated in FIG. 2.

At block 302, a latent vector, class label, and domain label are received. The latent vector, class label, and domain label can be selected or input in any manner. For example, a user may select one or more of the class label and the domain label. Such class labels and domain labels can be selected from, for example, a list of class labels and/or a list of domain labels on which a style-content adaptation system has been trained in relation to.

At block 304, a content vector is generated based on a class label. At block 306, the latent vector is matched to the content vector. Such matching can occur by mapping or aligning the latent vector to the content vector. In particular, this matching can be performed using coarse layers of an image generator. Coarse layers can be related to parameters that control lower resolutions in the output. Such coarse layers can be can be trained using an input of class labels. Using this input class label allows for alignment of coarse layer outputs with blurred real images in early iterations of the progressive training process. Such alignment leads to the image generator learning a shared representation for both domains when generating low-resolution images (e.g., based on the low resolution coarse layers). In this way, the coarse layers of the image generator can maintain content based on the class label.

At block 308, a style vector is generated based on a domain label. At block 310, the latent vector is matched to the style vector. In particular, this matching can be performed using fine layers of the image generator. Fine layers can be related to parameters that control higher resolutions in the output. Such fine layers can be trained using an input of domain labels. Using this input domain labels allows for alignment of fine layer outputs with a specific style based on a domain. In this way, the fine layers of the image generator can maintain a style based on the domain label.

At block 312, an image is generated. In particular, the image can be based on the input class label and domain label. In particular, matching using the coarse and fine layers of the fully connected layer allows for the coarse and fine layers to learn from different inputs allowing for disentanglement of domain-dependent variability (e.g., based on a domain label) from content variability (e.g., based on a class label).

Figure 4:
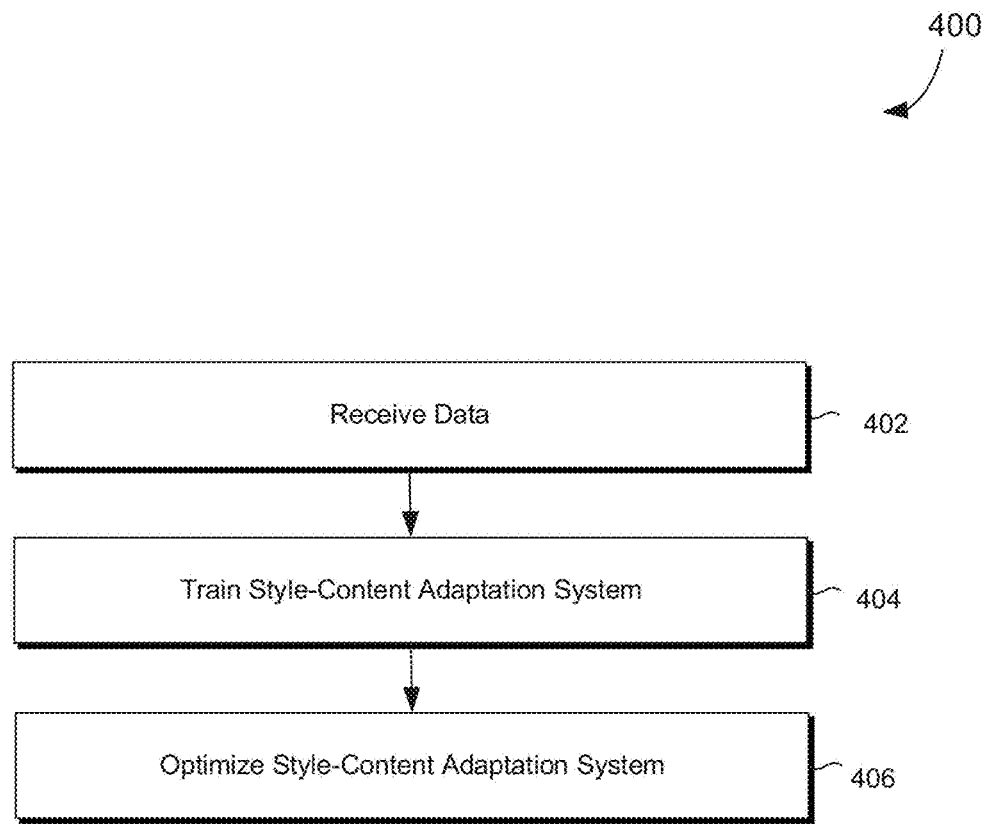
FIG. 4 depicts a process flow showing an embodiment(s) of a method(s) for training and/or utilizing a style-content adaptation system to generate images with controlled class labels that are in a target domain, in accordance with embodiments of the present disclosure.

With reference to FIG. 4, a process flow is provided showing an embodiment(s) of method 400 for training and/or utilizing a style-content adaptation system to generate images with controlled class labels that are in a target domain, in accordance with embodiments of the present disclosure. Such a method can take place using the style-content adaptation system 204 as described with reference to FIG. 2.

A style-content adaptation system trained in method 400 is based on a GAN architecture. Such a GAN architecture can be comprised of an image generator, an image classifier, and a joint discriminator. The image generator can generate images from an input (e.g., a vector). This generator portion can include coarse layers and fine layers. Coarse layers can be related to parameters that control lower resolutions in the output, whereas fine layers can be related to parameters that control higher resolutions in the output. The image classifier can be used to predict class labels (e.g., pseudo labels) for images in the target domain (e.g., because the class labels are unknown). The joint discriminator can incorporate an output conditioned on a joint label and evaluate the generated images for realism or authenticity.

At block 402, data is received. For example, data can be received and or selected from, for example, data store 202 of FIG. 2 and/or from a database stored in the cloud. In embodiments, the data can comprise images for training. During training of the style-content adaptation system, images can be selected based on the type of images to be generated (e.g., based on desired content contained an image indicated using a class label and/or domain label). Such images can be represented using a latent vector. The data can also include, for example, a class label and/or a domain label. Such a class label and domain label can be selected or input in any manner. For example, a user may select one or more of the class label and the domain label. Such class labels and domain labels can be selected from, for example, a list of class labels and/or a list of domain labels on which a style-content adaptation system has been trained in relation to.

At block 404, the style-content adaptation system is trained. For instance, progressive training can be used to train the style-content adaptation system. Progressive training allows for training the system at different resolutions. For instance, the style-content adaptation system can initially trained at a low resolution (e.g., 4×4) and then gradually the resolution is increased (e.g., up to 512×512). In this way, there are multiple layers at different resolutions in the image generator (where initial layers are the lower resolution and the later layers are the higher resolutions). In the joint discriminator, there can also be multiple layers for the different resolutions (where initial layers are the higher resolution and the later layers are the lower resolutions). The layers that are related to the lower resolutions can be referred to as coarse layers, and the layers that are related to the higher resolutions can be referred to as fine layers.

Initially, during training, the style-content adaptation system can receive an input of a class label. In particular, coarse layers of the style-content adaptation system can be trained using an input of class labels. Using this input class label allows for alignment of coarse layer outputs with blurred real images in the early iterations of the progressive training process that relates to the lower resolutions. Once the progressive training proceeds to higher resolutions using fine layers, a domain label can also be fed into of the style-content adaptation system. Training using the different inputs of class label and domain label, respectively, in relation to the coarse and fine layers of the fully connected layer allows for the coarse and fine layers to learn from different inputs allowing for disentanglement of domain-dependent variability (e.g., based on a domain label) from content variability (e.g., based on a class label).

At block 408, the style-content adaptation system is optimized. Optimization can be based on reducing errors in the system. For instance, the image generator and the joint discriminator of the style-content adaptation system can be trained simultaneously using a min/max optimization. In particular, the image generator can try to generate real images from the input vectors while the joint discriminator tries to distinguish images output by the generator as real or fake images. Generally, "real" images can be defined as images that are realistic, and "fake" images can be defined as images that are not realistic. Further, the image classifier can be trained to minimize loss, such that the class labels generated by the image classifier are accurate. In particular, with relation to class labels, the joint discriminator has an output based on the overall class (e.g., number of class labels).

The process of training and optimization can be repeated for a sufficiently large number of cycles. For instance, training can continue until the joint discriminator can no longer determine that generated images differ from real images. In some embodiments, a predefined number of epochs can be used for training the style-content adaptation system. Such a predefined number of epochs can balance the tradeoff between time and computational resources using during training and the accuracy of the functioning style-content adaptation system.

Figure 5:
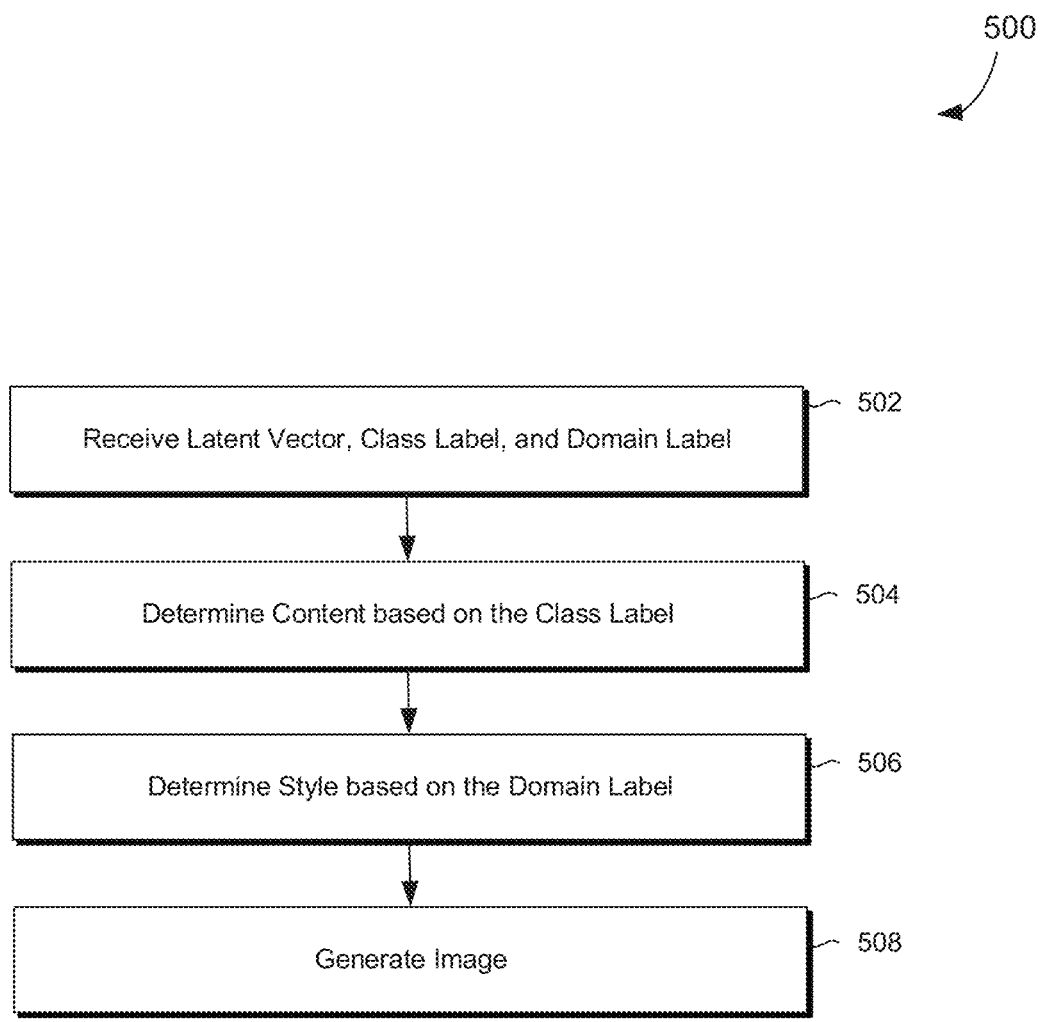
FIG. 5 depicts a process flow showing an embodiment of a method for generating images with controlled class labels that are in a target domain, in accordance with embodiments of the present disclosure.

With reference to FIG. 5, a process flow is provided showing an embodiment of method 500 for generating images with controlled class labels that are in a target domain, in accordance with embodiments of the present disclosure. Aspects of method 500 can be performed, for example, by style-content adaptation system 204, as illustrated in FIG. 2.

At block 502, a latent vector, class label, and domain label are received. The latent vector, class label, and domain label can be selected or input in any manner. For example, a user may select one or more of the class label and the domain label. Such class labels and domain labels can be selected from, for example, a list of class labels and/or a list of domain labels on which a style-content adaptation system has been trained in relation to.

At block 504, content is determined based on the class label. For instance, a class label can indicate what content should be contained in a generated image. Such content can related to a class (e.g., in a class of numbers, the class label 9 will result in the number 9 being in a generated image). To perform this determination, a content vector can be generated based on the class label. In particular, the content vector can be generated using coarse layers of an image generator of a style-content adaptation system. Coarse layers can be related to parameters that control lower resolutions in the output. These coarse layers are aligned during training such that the image generator learns a shared representation for both domains when generating low-resolution images (e.g., based on the low resolution coarse layers). In this way, the coarse layers of the image generator can maintain content based on the class label.

At block 506, style is determined based on the domain label. To perform this determination, a style vector can be generated based on the domain label. In particular, the style vector can be generated using fine layers of the image generator of the style-content adaptation system. Fine layers can be related to parameters that control higher resolutions in the output. These fine layers are aligned during training such that the image generator learns to align fine layer outputs with a specific style based on a domain. In this way, the coarse layers of the image generator can generate a style based on the domain label.

At block 508, an image is generated. In particular, the image can be based on the input class label and domain label. In particular, using the coarse and fine layers of the fully connected layer allows for the coarse and fine layers to learn from different inputs allowing for disentanglement of domain-dependent variability (e.g., based on a domain label) from content variability (e.g., based on a class label).

Figure 6:
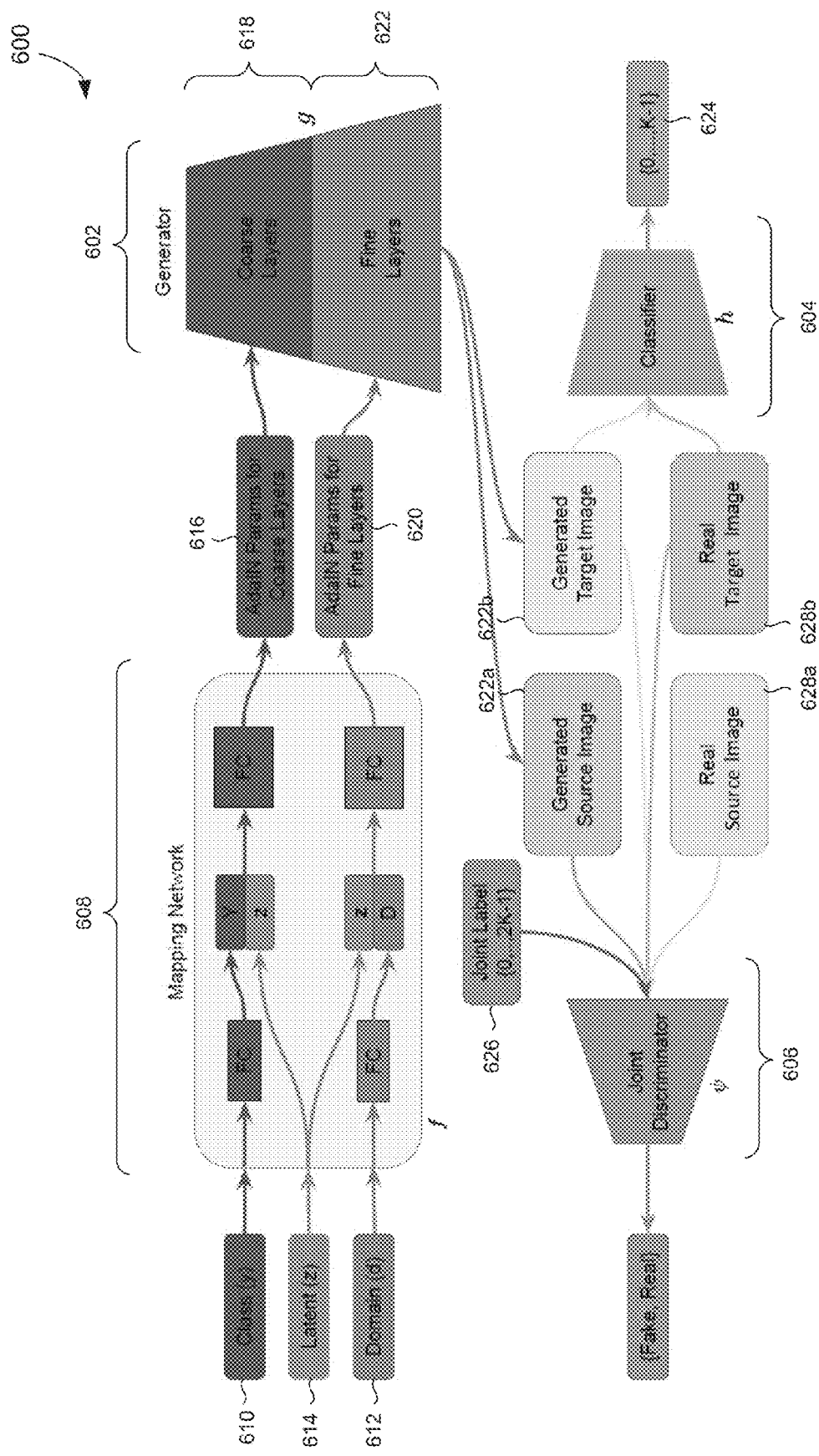
FIG. 6 depicts an example architecture used for training and/or using a style-content adaptation system, in accordance with various embodiments of the present disclosure.

FIG. 6 illustrates an example architecture for use in training a style-content adaptation system 600 that can be used to generate images in a target domain while maintaining an input class label, in accordance with embodiments of the present disclosure. Such a style-content adaptation system can be based on a GAN architecture. A GAN architecture can be comprised of image generator 602 (e.g., g), image classifier 604 (e.g., h) and joint discriminator 606 (e.g., ψ). Such an image generator can be related to fully connected layers 608 (e.g., f). Image generator 602 can be conditioned on both class label 610 (e.g., y) and domain label 612 (e.g., d). Class label 610 can be used to tweak coarse layer parameters 616 related to coarse layers 618 of image generator 602. Domain label 612 can be used to tweak fine layer parameters 620 related to fine layers 622 of image generator 602. In particular, image generator 602 can generate generated image 622 (e.g., generated source image 622*a* or generated target image 622*b*) from latent vector 614 (e.g., z) in conjunction with class label 610 and domain label 612.

In embodiments, generated target image 622*b* can be input into image classifier 604. Image classifier 604 can generate class labels for input images. In particular, the image classifier can be used to determine class label 624 for generated target image 622*b*. Because generated target image 622*b* is in the target domain, the class labels are unknown. During training of the style-content adaptation system, the image classifier can be used to predict class label 624 (e.g., pseudo labels) for generated target image 622*b*. These pseudo labels can be used during the training of image generator 602.

Joint discriminator 606 can be used evaluate generated images and real images for realism or authenticity (e.g., to decide whether an image is "real" or "fake"). Joint discriminator 606 can also incorporate an output conditioned on joint label 626. In particular, in embodiments related to images in the target domain (e.g., generated target image 622*b* or real target image 628*b*), the joint discriminator can evaluate joint label 626 that is based on a pseudo label (e.g., class label 624 predicted by image classifier 604) in addition to evaluating whether generated target image 622*b* or real target image 628*b* is "real" or "fake. In embodiments related to images in the source domain (e.g., generated source image 622*a* or real source image 628*a*), the joint discriminator can evaluate joint label 626 that is based a known ground-truth class label in addition to evaluating whether generated source image 622a or real source image 628a is "real" or "fake. Such information can be used, for example, in guiding the training of image generator 602.

To train style-content adaptation system 600, progressively training in an adversarial manner can be used. Progressive training allows for training at different resolutions. For instance, initially training can be performed at a low resolution (e.g., 4×4) and then gradually the resolution is increased (e.g., up to 512×512). In this way, there are multiple layers at the different resolutions.

Initially, during training in lower resolutions, an input of a class label can be used. In particular, coarse layer parameters 616 can be trained based on class label 610. Using this input class label 616 leads to image generator 602 learning a shared representation for both domains when generating low resolution images (e.g., based on coarse layer parameters 616). When training in higher resolutions, an input of a domain label can be used. In particular, fine layer parameters 620 can be trained based on domain label 612. These fine layers are aligned during training such that image generator 602 learns to align fine layer outputs with a specific style based on domain label 612.

The process of training style-content adaptation system 600 can be repeated for a sufficiently large number of cycles. For instance, training can continue until joint discriminator 606 can no longer determine that generated images differ from real images. In some embodiments, a predefined number of epochs can be used (e.g., 300 epochs). Such a predefined number of epochs can balance the tradeoff between time and computational resources using during training and the accuracy of the functioning system.

Upon completion of training of style-content adaptation system 600, the style-content adaptation system can be used to generate images based on an input class label and domain label. In some embodiments, only image generator 602 can be used to generate images when running style-content adaptation system 600. In other embodiments, image classifier 604 can be used to determine a class label for images in the source and/or target domains. In still further embodiments, image generator 602 can be used to generate images based on an input class label and domain label and then image classifier 604 can be used to determine a class label for the generated image.

FIGS. 7A and 7B illustrate example images 700A-700B generated using a style-content adaptation system, in accordance with embodiments of the present disclosure, such as those described above in connection with FIGS. 1-6. For instance, FIG. 7A depicts example images 700A generated by a style-content adaptation system using linear interpolation of an input latent vector fed into coarse layers of an image generator of the style-content adaptation system. For instance, images in the left and right most columns of each panel are generated images from a source and target domains respectively. Images in between the two are generated by fixing the input latent vector that goes into fine layers while interpolating the coarse latent vector from the source image to the target image. As a result, domain factors (e.g., background, digit, colors) are the same as the source image. Other factors (e.g., rotation, boldness) change to match the target image. When the class labels are different from the source and target image (e.g., two panels in the right), the class labels also change to match the target image. Such results verify that coarse layer parameters control the class label while not affecting the domain-dependent variations.

FIG. 7B depicts example images 700B generated using a style-content adaptation system. FIG. 7B depicts example images 700B generated by a style-content adaptation system using linear interpolation of an input latent vector fed into fine layers of an image generator of the style-content adaptation system. For instance, images in the left and right most columns of each panel are generated images from a source and target domains respectively. Images in between the two are generated by fixing the input latent vector that goes into coarse layers while interpolating the fine latent vector. In particular, domain factors (e.g., background, digit colors, etc.) interpolate to match the target image. Other factors (e.g., rotation, boldness, etc.) are the same as the source image. When the class labels are different for the source and target images (e.g., two panels in the right), the class labels are kept the same as the source image. Such results verify that the fine layer parameters control the domain of generated image while not affecting the class label.

Figure 8A:
FIGS. 8A-8B illustrate example images generated using a style-content adaptation system, in accordance with embodiments of the present disclosure.
Figure 8B:
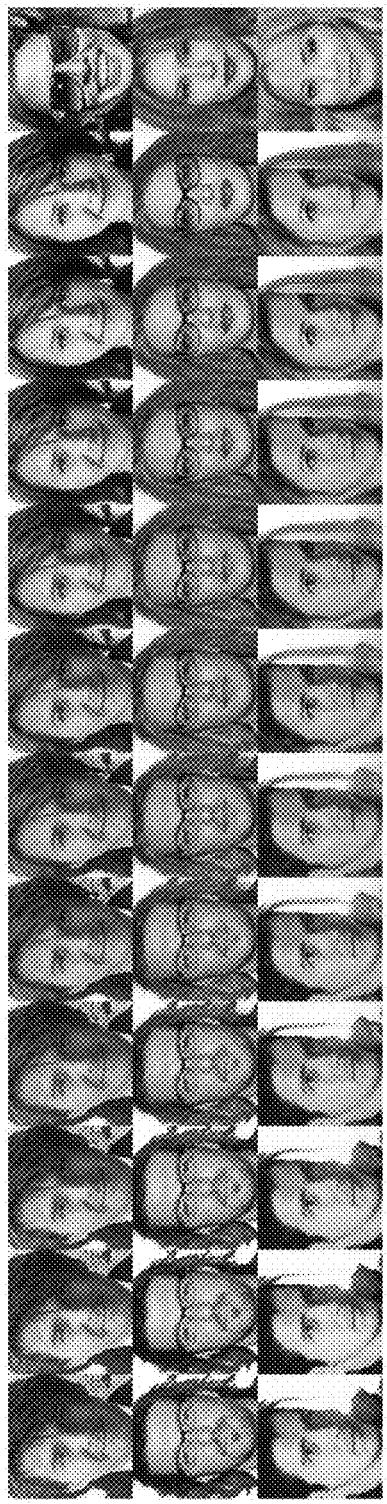

FIGS. 8A and 8B illustrate example images 800A-800B generated using a style-content adaptation system, in accordance with embodiments of the present disclosure, such as those described above in connection with FIGS. 1-6. For instance, FIG. 8A depicts example images 800A generated by a style-content adaptation system. In particular, the domain is defined by gender and the class by the presence/absence of eyeglasses. For instance, eyeglasses are added to the faces for the first and third rows while eyeglasses are removed in the second row. However, gender does not change in any of the rows. Such results verify that the coarse layer parameters control the class (e.g., eyeglasses) of generated images while not affecting the domain (e.g., gender). FIG. 8B depicts example images 800B generated using a style-content adaptation system. In particular, the domain remains defined by gender and the class by the presence/absence of eyeglasses, as in FIG. 8A. Gender changes in all of the rows to match a target gender. In the first row, no eyeglasses are added even though the target image has eyeglasses. In the second row, eyeglasses are not removed even though the target image does not have eyeglasses. Such results verify that the fine layer parameters control the domain (e.g., gender) of generated images while not affecting the class (e.g., eyeglasses)

Figure 9:
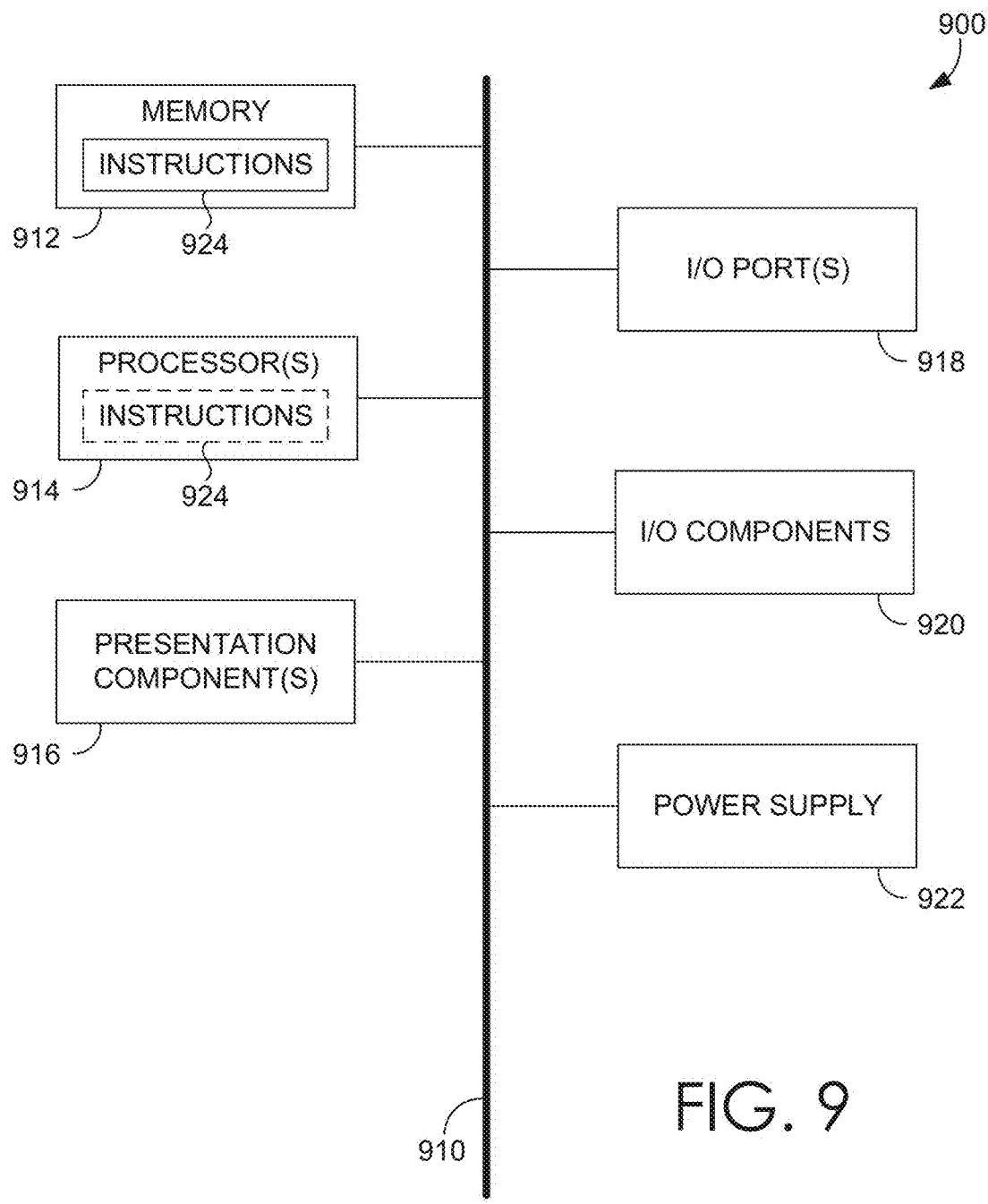
FIG. 9 is a block diagram of an example computing device in which embodiments of the present disclosure may be employed.

Having described embodiments of the present invention, an example operating environment in which embodiments of the present invention may be implemented is described below in order to provide a general context for various aspects of the present invention. Referring to FIG. 9, an illustrative operating environment for implementing embodiments of the present invention is shown and designated generally as computing device 900. Computing device 900 is but one example of a suitable computing environment and is not intended to suggest any limitation as to the scope of use or functionality of the invention. Neither should the computing device 900 be interpreted as having any dependency or requirement relating to any one or combination of components illustrated.

Embodiments of the invention may be described in the general context of computer code or machine-useable instructions, including computer-executable instructions such as program modules, being executed by a computer or other machine, such as a smartphone or other handheld device. Generally, program modules, or engines, including routines, programs, objects, components, data structures, etc., refer to code that perform particular tasks or implement particular abstract data types. Embodiments of the invention may be practiced in a variety of system configurations, including hand-held devices, consumer electronics, general-purpose computers, more specialized computing devices, etc. Embodiments of the invention may also be practiced in distributed computing environments where tasks are performed by remote-processing devices that are linked through a communications network.

With reference to FIG. 9, computing device 900 includes a bus 910 that directly or indirectly couples the following devices: memory 912, one or more processors 914, one or more presentation components 916, input/output ports 918, input/output components 920, and an illustrative power supply 922. Bus 910 represents what may be one or more busses (such as an address bus, data bus, or combination thereof). Although the various blocks of FIG. 9 are shown with clearly delineated lines for the sake of clarity, in reality, such delineations are not so clear and these lines may overlap. For example, one may consider a presentation component such as a display device to be an I/O component, as well. Also, processors generally have memory in the form of cache. We recognize that such is the nature of the art, and reiterate that the diagram of FIG. 9 is merely illustrative of an example computing device that can be used in connection with one or more embodiments of the present disclosure. Distinction is not made between such categories as "workstation," "server," "laptop," "hand-held device," etc., as all are contemplated within the scope of FIG. 9 and reference to "computing device."

Computing device 900 typically includes a variety of non-transitory computer-readable media. Non-transitory Computer-readable media can be any available media that can be accessed by computing device 900 and includes both volatile and nonvolatile media, removable and non-removable media. By way of example, and not limitation, non-transitory computer-readable media may comprise non-transitory computer storage media and communication media.

Non-transitory computer storage media include volatile and nonvolatile, removable and non-removable media implemented in any method or technology for storage of information such as computer-readable instructions, data structures, program modules or other data. Non-transitory computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 900. Non-transitory computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 912 includes computer storage media in the form of volatile and/or nonvolatile memory. As depicted, memory 912 includes instructions 924. Instructions 924, when executed by processor(s) 914 are configured to cause the computing device to perform any of the operations described herein, in reference to the above discussed figures, or to implement any program modules described herein. The memory may be removable, non-removable, or a combination thereof. Illustrative hardware devices include solid-state memory, hard drives, optical-disc drives, etc. Computing device 900 includes one or more processors that read data from various entities such as memory 912 or I/O components 920. Presentation component(s) 916 present data indications to a user or other device. Illustrative presentation components include a display device, speaker, printing component, vibrating component, etc.

I/O ports 918 allow computing device 900 to be logically coupled to other devices including I/O components 920, some of which may be built in. Illustrative components include a microphone, joystick, game pad, satellite dish, scanner, printer, wireless device, etc.

Embodiments presented herein have been described in relation to particular embodiments which are intended in all respects to be illustrative rather than restrictive. Alternative embodiments will become apparent to those of ordinary skill in the art to which the present disclosure pertains without departing from its scope.

From the foregoing, it will be seen that this disclosure in one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in a limiting sense, and the scope of embodiments is defined by the appended claims and their equivalents.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)."

What is claimed is:

1. A computer-implemented method, comprising:
   receiving a selection of a class label indicating content and a domain label indicating a style;
   aligning an input latent vector, using a neural network, in relation to coarse network parameters of the neural network based on the content indicated by the class label and in relation to fine network parameters of the neural network based on the style indicated by the domain label, wherein aligning the input latent vector in relation to the coarse network parameters of the neural network comprises matching the input latent vector to a content vector generated based on the class label using coarse layers of the neural network, and wherein aligning the input latent vector in relation to the fine network parameters of the neural network comprises matching the input latent vector to a style vector generated based on the domain label using fine layers of the neural network; and
   generating an image, using the aligned latent vector, wherein the image contains the content and the style based on the selected class label and domain label.

2. The computer-implemented method of claim 1, wherein the coarse layers of the neural network are used to learn the coarse network parameters that align low-resolution images to both a source domain and a target domain in relation to a corresponding class label.

3. The computer-implemented method of claim 1, wherein the fine layers of the neural network are used to learn the fine network parameters that control a domain of the image, the domain based on the domain label, while not affecting content of the image related to the class label.

4. The computer-implemented method of claim 1, further comprising:
   determining, using an image classifier, a predicted class label for the image generated using the neural network, wherein the image is in a target domain.

5. The computer-implemented method of claim 1, further comprising:
   training a style-content adaptation system, wherein the training comprises:
   training the coarse layers of the neural network using class labels to align low-resolution images to both a source domain and a target domain in relation to a corresponding class label;
   training the fine layers of the neural network using domain labels to maintain a style based on the domain labels;
   training an image classifier to predict the class labels for generated images; and
   updating the style-content adaptation system for errors using loss.

6. The computer-implemented method of claim 5, wherein the class labels predicted by the image classifier are used by a joint discriminator as ground-truth class labels for training the image generator, wherein the joint discriminator further evaluates the generated images for realism.

7. The computer-implemented method of claim 5, wherein the loss comprises one or more of conditional loss, classification loss, target entropy loss, regularization loss, and domain adversarial loss.

8. One or more computer storage media storing computer-useable instructions that, when used by one or more computing devices, cause the one or more computing devices to perform operations comprising:
   receiving a class label and a domain label;
   matching an input latent vector to a content vector generated based on the class label using coarse layers of a neural network, wherein the coarse layers of the neural network are used to learn coarse layer parameters that align low-resolution images to both a source domain and a target domain in relation to a corresponding class label; and
   generating an image using the neural network, wherein the image is based on the input latent vector matched to the content vector using the coarse layers of the neural network and the input latent vector matched to the domain label using the fine layers of the neural network and the image is low-resolution representation of the source domain and the target domain for a class label.

9. The one or more computer storage media of claim 8, wherein the class label indicates content of interest to contain in the image.

10. The one or more computer storage media of claim 8, wherein the domain label indicates a domain of interest to contain in the image.

11. The one or more computer storage media of claim 8, wherein the fine layers of the neural network learn fine layer parameters that control a domain of the image, the domain based on the domain label, while not affecting content of the image related to the class label.

12. The one or more computer storage media of claim 8, the operations further comprising:
   determining, using an image classifier, a predicted class label for the image generated using the neural network, wherein the image is in the target domain.

13. The one or more computer storage media of claim 8, the operations further comprising:
   training a style-content adaptation system, wherein the training comprises:
   training the coarse layers of the neural network using class labels to align the low-resolution images to both the source domain and the target domain in relation to the corresponding class label;
   training the fine layers of the neural network using domain labels to maintain a style based on the domain labels;
   training an image classifier to predict the class labels for generated images; and
   updating the style-content adaptation system for errors using loss.

14. The one or more computer storage media of claim 13, wherein the loss comprises one or more of conditional loss, classification loss, target entropy loss, regularization loss, and domain adversarial loss.

15. The one or more computer storage media of claim 13, wherein the class labels predicted by the image classifier are used by a joint discriminator as ground-truth class labels for training the neural network, wherein the joint discriminator further evaluates the generated images for realism.

16. A computing system comprising:
- means for receiving class label and a domain label;
- means for matching a latent vector to a content vector generated based on the class label in relation to coarse network parameters of a neural network, wherein the coarse network parameters control low-resolutions in an image and the class label adjusts coarse layer parameters related to coarse layers;
- means for matching the latent vector to a style vector generated based on the domain label in relation to fine network parameters of a neural network, wherein the fine network parameters control high-resolutions in the image and the domain label adjusts fine layer parameters related to fine layers; and
- means for generating an image, based on the latent vector matched to the content vector and the domain label matched to the style vector.

17. The computing system of claim 16, further comprising:
- means for classifying the image based on content of the image, the classification indicated using a predicted class label.

18. The computing system of claim 16, further comprising:
- means for training a style-content adaptation system, the style-content adaptation system providing the means for matching the latent vector to the content vector and the means for matching the latent vector to the style vector.

* * * * *